United States Patent
Vinnakota et al.

(10) Patent No.: US 7,336,678 B2
(45) Date of Patent: Feb. 26, 2008

(54) STATE-BASED JITTER BUFFER AND METHOD OF OPERATION

(75) Inventors: Bapiraju Vinnakota, Fremont, CA (US); Saleem Mohammadali, Bangalore (IN); David W. Gilbert, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 1076 days.

(21) Appl. No.: 10/210,431

(22) Filed: Jul. 31, 2002

(65) Prior Publication Data

US 2004/0022262 A1 Feb. 5, 2004

(51) Int. Cl.
*H04L 12/54* (2006.01)
*H04L 12/56* (2006.01)
(52) U.S. Cl. .................... 370/429; 370/412
(58) Field of Classification Search .............. 370/411
See application file for complete search history.

(56) References Cited

U.S. PATENT DOCUMENTS

| | | | |
|---|---|---|---|
| 5,353,430 A * | 10/1994 | Lautzenheiser ............ 711/117 |
| 5,640,388 A | 6/1997 | Woodhead et al. |
| 5,790,543 A | 8/1998 | Cloutier |
| 5,805,602 A | 9/1998 | Cloutier et al. |
| 5,966,387 A | 10/1999 | Cloutier |
| 5,996,018 A | 11/1999 | Duault et al. |
| 6,118,792 A | 9/2000 | Beshai |
| 6,181,712 B1 | 1/2001 | Rosengren |
| 6,212,206 B1 | 4/2001 | Ketcham |
| 6,301,258 B1 | 10/2001 | Katseff et al. |
| 6,327,276 B1 | 12/2001 | Robert et al. |
| 6,360,271 B1 | 3/2002 | Schuster et al. |
| 6,366,959 B1 | 4/2002 | Sidhu et al. |
| 6,977,948 B1 * | 12/2005 | Chennubhotla et al. ..... 370/516 |
| 2003/0026275 A1 * | 2/2003 | Lanzafame et al. ......... 370/412 |
| 2003/0026277 A1 * | 2/2003 | Pate et al. .................. 370/412 |

* cited by examiner

*Primary Examiner*—Kwang Bin Yao
*Assistant Examiner*—Warner Wong
(74) *Attorney, Agent, or Firm*—Caven & Aghevli LLC

(57) ABSTRACT

A buffer having an associated state array to store the current state of the buffer. The state array includes a bit array having a number of entries, each of the entries including a status bit to indicate storage of a corresponding packet in the buffer.

29 Claims, 13 Drawing Sheets

STATE-BASED JITTER BUFFER AND METHOD OF OPERATION

FIELD

Embodiments of the invention relate generally to the transmission of packets over a network and, more particularly, to a jitter buffer having an associated state array.

BACKGROUND

In voice-over-packet telephony, an audio conversation is transmitted over a network as a stream of packets. A number of factors can affect the quality of the audio stream, including packet loss, packet delay, and packet jitter. Packet loss may result from packet collisions or network overload, and variable routing paths may cause some packets of a packet stream to be delayed relative to other packets in that stream. Packet losses and delays—both of which are typically beyond the control of the receiver—may result in a stream of packets being received out of order and at a non-constant rate, thereby causing packet jitter. A stream of audio (and/or video) packets must, however, be played out in the correct order and at a constant rate in order to reconstruct the original message.

To assist the receiving system in reassembling an audio (and/or video) message, each packet in the audio stream may be transmitted with a sequence number and a timestamp. The sequence number of a packet represents the position or order of that packet relative to all other packets in a packet stream. The timestamp of a packet represents the time at which the packet was created, thereby providing an indication of the time differential, or time spacing, between packets. The sequence number and timestamp are usually contained in a packet header. Taken together, the sequence number and timestamp inform the receiving system of the correct order and timing for the play-out of an audio and/or video stream. Packet format, including the sequence number and timestamp, is usually specified by a protocol, such as, for example, the Real-Time Transport Protocol (RTP). See, e.g., Internet Engineering Task Force—Request For Comments (IETF RFC) 1889, *RTP: A Transport Protocol for Real-Time Applications*, January 1996; and IETF RFC 1890, *RTP Profile for Audio* and *Video Conferences with Minimal Control*, January 1996.

To compensate for packet jitter in voice-over-packet audio (and/or video) applications, a jitter buffer may be employed. Generally, a jitter buffer comprises a memory that can collect a number of packets of a stream of packets and, further, that can hold some of these packets for a long enough period to allow the slowest packets to arrive in time to be played out in the correct order. The jitter buffer will order the packets in the correct sequence according to the packet sequence numbers, and then play out the packets at a constant rate, wherein the packet timestamps provide the time spacing between successive packets.

Conventional jitter buffers do, however, suffer from a number of drawbacks. For example, a typical jitter buffer is implemented as a linked list of packets, the order of the linked list dictated by the packet sequence numbers. In order to insert a received packet into the proper location in the linked list—again, as noted above, packets are often received out of order—the entire linked list may have to be searched to identify the correct position. Traversing the linked list for every insertion operation can introduce significant latency, which is especially troublesome for real-time audio and/or video applications. Also, because the memory requirements for storing a stream of packets is generally large, a jitter buffer is usually stored in off-chip memory. To insure packet synchronization during the play-out process, the timestamp may be read from each packet stored in the jitter buffer. However, reading the timestamp of a packet resident in an external jitter buffer is a costly process from a latency standpoint, as the process requires an access to off-chip memory.

DETAILED DESCRIPTION

Figure 1:
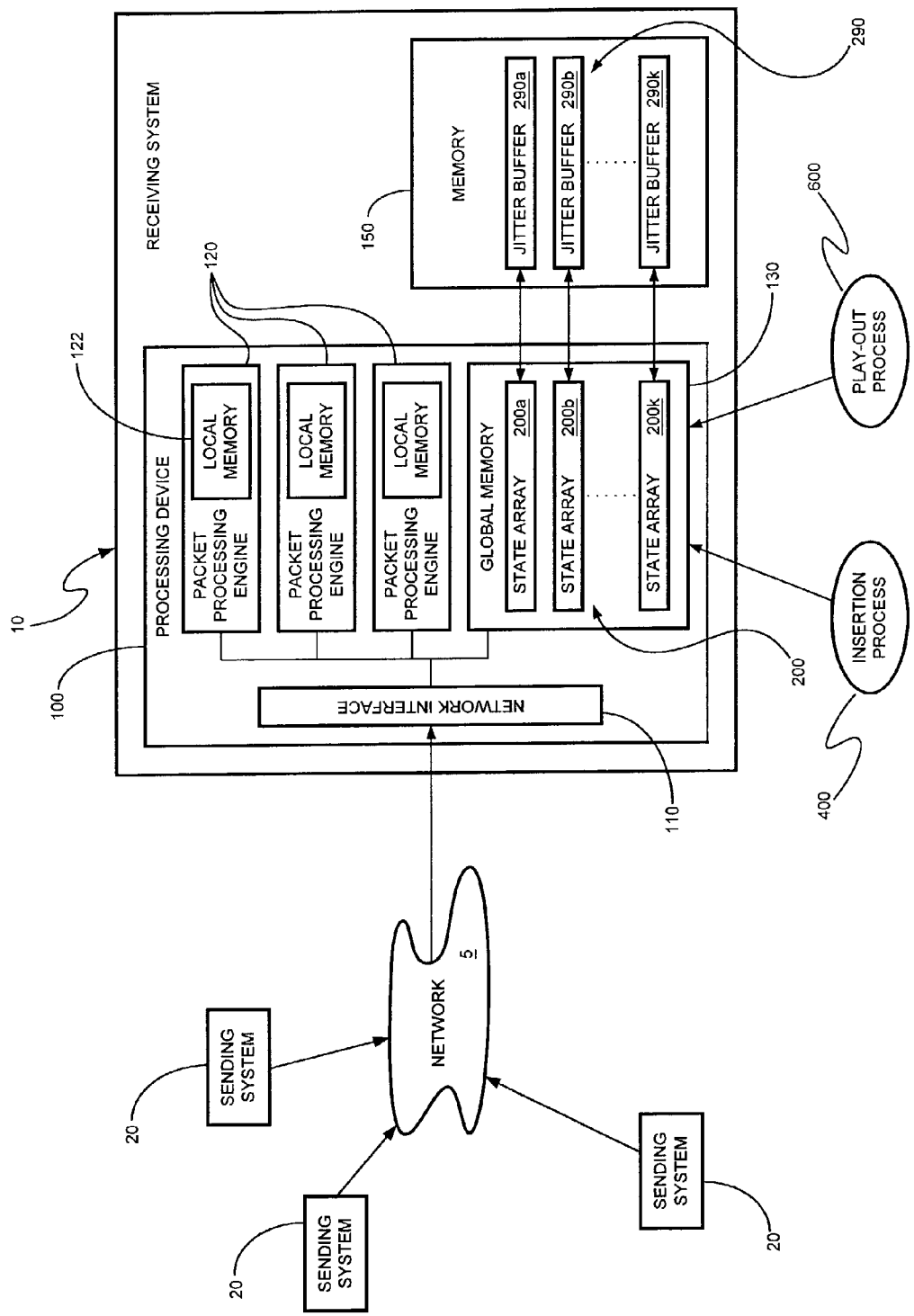
FIG. 1 is a schematic diagram illustrating an embodiment of a receiving system coupled with a network, the receiving system including a state-based jitter buffer.

Referring to FIG. 1, an exemplary embodiment of a receiving system 10 is illustrated. The receiving system 10 is coupled with a network 5. The network 5 may, in turn, be coupled with one or more sending systems 20, each sending system 20 comprising any addressable device or node coupled with the network 5. The network 5 may comprise any type of network, including the Internet, a wide area network (WAN), a metropolitan area network (MAN), a local area network (LAN), or a system area network (SAN), that exhibits any suitable network architecture.

A sending system 20 may send a message comprising a stream of packets (e.g., an audio and/or video message) to the receiving system 10. The packetized message may conform with a set of specifications or protocol, such as the Real-Time Transport Protocol, as noted above. The packets making up a message transmitted by one of the sending systems 20 may travel a number of different paths across the network 5 to reach the receiving system 10. Thus, some packets may be delayed relative to others. Further, packet collisions and overload conditions within the network 5 may result in the loss of some of these packets. Due to these packet delays and losses, the receiving system 10 will experience packet jitter and will receive packets out of order.

The receiving system 10 comprises a processing device 100 coupled with an external, or off-chip, memory 150. The processing device 100 includes a network interface 110 to couple the processing device 100 with the network 5. Coupled with the network interface 110 are one or more packet processing engines 120, each packet processing engine 120 having a local (on-chip) memory 122. Although three packet processing engines 120 are illustrated in FIG. 1, it should be understood that the processing device may have more (or less) than three processing engines 120.

An on-chip global memory 130 is coupled with each of the packet processing engines 120, as well as being coupled with the network interface 110. Resident in the global memory 130 is a number of state arrays 200, including state arrays 200a, 200b, ..., 200k. Each packet processing engine 120 has access to all state arrays 200a-k. An equal number of corresponding jitter buffers 290 are stored in the off-chip memory 150, including jitter buffers 290a, 290b, ..., 290k. The state array 200a is associated with the jitter buffer 290a, the state array 200b is associated with the jitter buffer 290b, and so on, as illustrated in FIG. 1. Each jitter buffer 290 and its corresponding state array 200 can handle the packet stream associated with one "flow" of information (i.e., a stream of packets associated with a message being received from one sending system 20).

When a sending system 20 transmits a message (e.g., an audio and/or video message) comprising a stream of packets to the receiving system 10, the network interface 110 will route each packet to one of the packet processing engines 120, which stores the packet in its local memory 122. The packet processing engine 120 will access the packet in local memory 122 to read the packet's sequence number and timestamp, and the packet processing engine 120 will use this information to insert the packet into a jitter buffer 290, as will be explained in more detail below. The packet processing engine 120 may also read a marker bit from the packet (the use of marker bits is also explained below in greater detail). The state of each jitter buffer 290a-k is stored in that jitter buffer's associated state array 200a-k, respectively, which is described below in greater detail. A packet insertion process 400 and a packet play-out process 600 may be executed by the processing device 100, and each state array 200 serves as a handshake between these two processes 400, 600.

The receiving system 10 shown in FIG. 1 is intended to represent an exemplary embodiment of such a system. However, it should be understood that the receiving system 10 may include many additional elements, which have been omitted from FIG. 1 for ease of understanding. By way of example, the receiving system 10 may further include an output device (e.g., an audio and/or video output device), a data input device (e.g., a keypad or a pointing device, such as a mouse), a data storage device (e.g., a hard disk drive and/or a removable storage media, such as floppy disk drive or a flash memory card), and a power source.

Similarly, it should also be understood that the processing device 100 is intended to represent an exemplary embodiment of such a device and, further, that the processing device 100 may include many additional elements, which have been omitted from FIG. 1 for clarity. For example, the processing device 100 may further include control logic and/or circuitry, as well as program memory associated with the packet processing engines 120. Most importantly, it should be understood that the embodiments described herein are not limited to any particular architecture or arrangement—as well as not being limited to any particular terminology used to describe such an architecture or arrangement—and the disclosed embodiments may be practiced on any type of receiver and/or processing device, irrespective of the architecture or the terminology ascribed to it.

Figure 2:
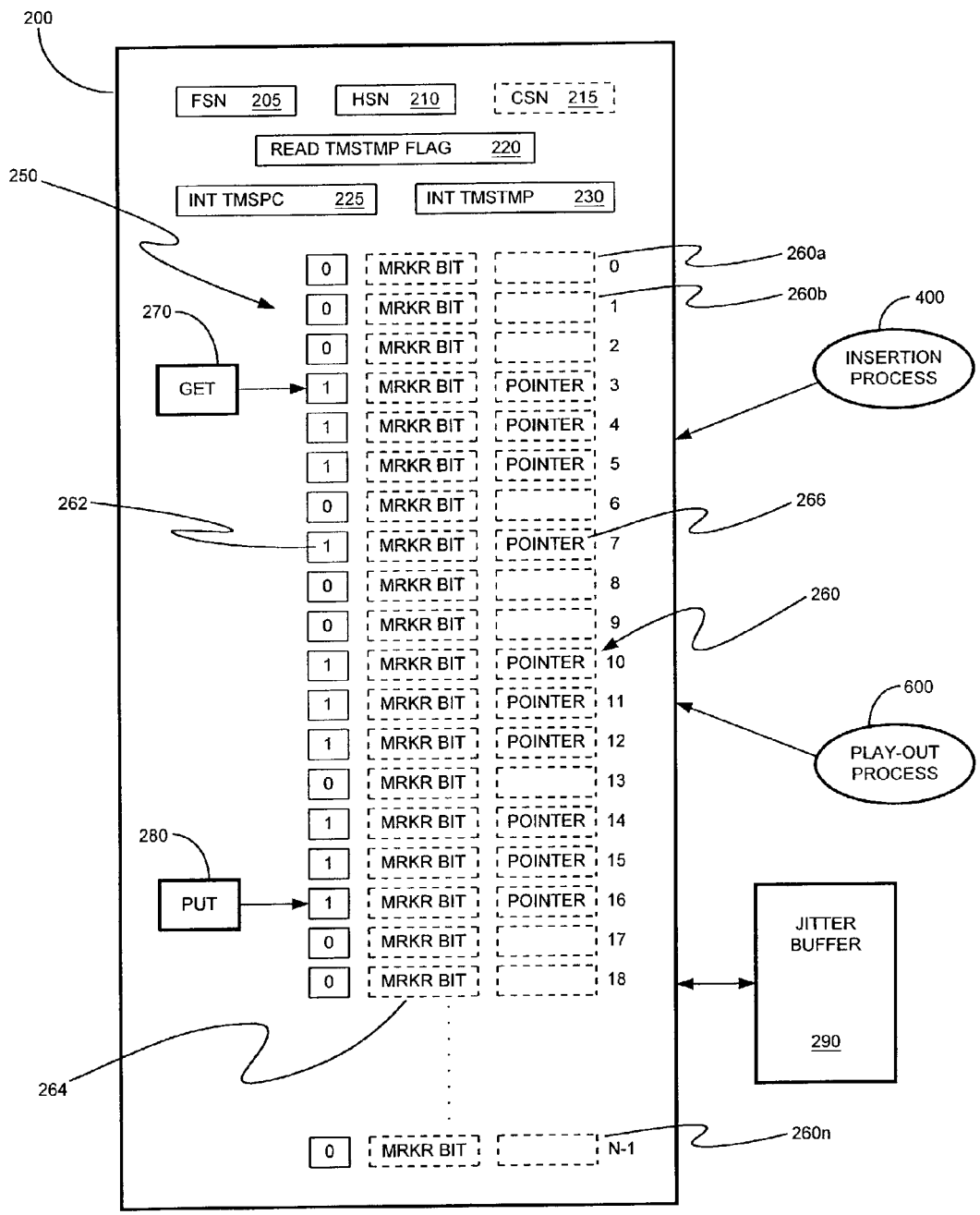
FIG. 2 is a schematic diagram illustrating an embodiment of a state array shown in FIG. 1.

Referring now to FIG. 2, an embodiment of a state array 200 is shown, the illustrated state array 200 being coupled with a jitter buffer 290. The state array 200 provides a "snapshot" of the current status of its associated jitter buffer 290 and, as noted above, the state array 200 handshakes between a packet insertion process 400 and a packet play-out process 600.

The state array 200 may store a sequence number of the first received packet of a message, this sequence number being referred to herein as the "first sequence number" or FSN 205. State array 200 may also store the highest sequence number for all received packets of the message, this sequence number referred to herein as the "highest sequence number" or HSN 210. When a packet is passed to the local memory 122 of a packet processing engine 120 for processing (e.g., insertion), the packet processing engine 120 may read that packet's sequence number, and this sequence number will be referred to herein as the "current sequence number" or CSN 215. Storage of the CSN 215 in the state array 200 is generally unnecessary; however, in one embodiment, the CSN 215 may be stored in the state array 200, as illustrated in FIG. 2.

The state array 200 may also store a read timestamp flag (READ TMSTMP FLAG) 220. As will be explained in more detail below, the READ TMSTMP FLAG 220 informs the receiving system 10 that, during the packet play-out process 600, the next packet referenced by the bit array 250—i.e., the packet that is next-in-line for play-out—is to be accessed to read that packet's timestamp. A packet's timestamp will be referred to herein as the "actual timestamp" (ACT TMSTMP). To indicate that the next-in-line packet is to be accessed in order to read the packet's actual timestamp, the READ TMSTMP FLAG 220 may be set high (e.g., a 1-bit)—or, alternatively, the READ TMSTMP FLAG 220 may be set low (e.g., a 0-bit)—to indicate that the next packet's timestamp is to be read.

State array 200 may further store an "internal time spacing" (INT TMSPC) 225 and an "internal timestamp" (INT TMSTMP) 230. As will be explained below, storing the state of a jitter buffer 290 in its associated state array 200 allows the receiving system 10 to infer—based upon, for example, the protocol being used—a time differential between packets, and this inferred time differential is referred to herein as the "internal time spacing" or INT TMSPC 225. The internal time spacing may be obtained from a control packet received from a sending system 20. Based upon this internal time spacing, the receiving system 10 can infer a timestamp for some (if not most) of the packets in a flow of packets, this inferred timestamp being referred to herein as the "internal timestamp" or INT TMSTMP 230.

The state array 200 also includes a bit array 250. The bit array 250 comprises a number of entries 260, including entries 260a, 260b, ..., 260n (which are numbered from 0 to N−1, for a total of N number of entries). The number N of entries 260 contained in the bit array 250 is generally equal to the maximum number of packets (e.g., 32) that may be stored in the associated jitter buffer 290 at any instant in time. Each entry 260 includes a status bit (or bits) 262. As will be explained below, the status bit 262 of an entry 260 indicates whether a packet corresponding to that entry 260 of bit array 250 is currently stored in the associated jitter buffer 290. For example, a status bit 262 set high (e.g., a 1-bit) indicates the entry 260 has a corresponding packet stored in the jitter buffer 290, whereas a status bit 262 set low (e.g., a 0-bit) indicates no corresponding packet has been received. Of course, it should be understood that it is equivalent to set the status bit 262 low to indicate receipt and storage of a packet, whereas a high status bit would indicate that no corresponding packet has been received.

In another embodiment, each entry 260 further includes a marker bit (MRKR BIT) 264. During the transmission of a message, there may be intentional periods of silence wherein no packets are being transmitted by the sending system. In this instance, the packet sequence numbers may be in sequential order; however, the packet timestamps may not increase at a uniform rate. A marker bit (or bits) may be included in each packet of a message stream to indicate whether a packet corresponds to the start of "talk spurt" following a period of silence. For example, a transmitted message may comprise a first packet having a sequence number of 1 and a timestamp of 10 milliseconds (ms), a second packet having a sequence number of 2 and a timestamp of 20 ms, and a third packet having a sequence number of 3 and a timestamp of 90 ms. The marker bit of the third packet (having sequence number 3 and timestamp 90 ms) may indicate—e.g., by setting the marker bit high—to the receiving system that this packet follows a period of silence. The receiving system may then take appropriate action to insure synchronization during play-out. If marker bits are being used, each entry 260 of the bit array 250 may include a marker bit (or bits) 264 for each received packet, the marker bit in each entry 260 also referred to herein as the MRKR BIT. The marker bit (or bits) 264 of an entry 260 will be set high (e.g., a 1-bit)—or, alternatively, set low (e.g., a 0-bit)—to indicate that the packet stored in the jitter buffer 290 corresponding to that entry 260 is the first packet following a period of silence. It should be understood that marker bits may not be used by the sending system. If marker bits are not being used, the sending system may simply transmit silence packets during periods of silence, such that packets are always being sent at regular intervals.

In a further embodiment, each entry 260 also includes a pointer 266. If successive packets in the jitter buffer 290 are arranged in contiguous memory locations, the insertion of new packets into the jitter buffer 290 necessitates a simple base address plus offset calculation to determine a packet's memory address, and a pointer 266 is unnecessary. However, if the jitter buffer 290 is comprised of arbitrary memory locations, a pointer 266 in an entry 260 can be used to identify the location in jitter buffer 290 of any packet corresponding to that entry.

The state array 200 also includes a get pointer (GET) 270 and a put pointer (PUT) 280. The get pointer 270 shows the play-out process 600 which packet is next-in-line to be played out or otherwise output by the receiving system 10. The put pointer 280 shows the insertion process 400 which packet has the highest timestamp of all packets stored in the jitter buffer 290—i.e., the put pointer 280 identifies the packet corresponding to the HSN 220. The insertion process 400 will update the put pointer 280, moving it forward as new packets are placed in the jitter buffer 290. The play-out process 600 will update the get pointer 270, moving it towards the put pointer 280 as packets are played out from the jitter buffer 290. As will be explained below, the get and put pointers 270, 280 define a range of valid locations in the jitter buffer 290 within which the jitter buffer will accept new packets, this range of valid locations being referred to herein as the "acceptance window." Any packet having a sequence number falling outside the acceptance window— e.g., because it is too early or too late—will not be accepted and is discarded.

Figure 3:
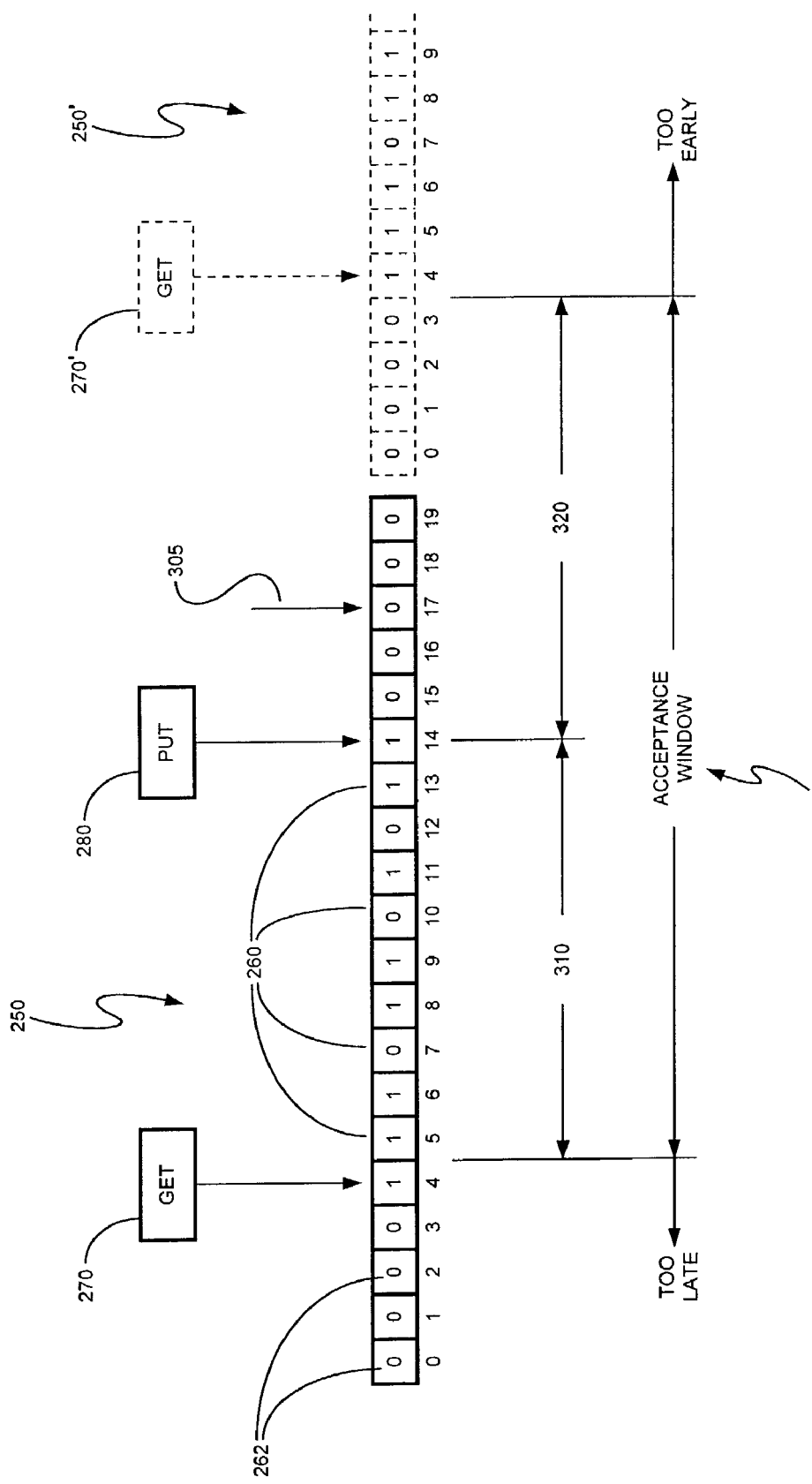
FIG. 3 is a schematic diagram illustrating an acceptance window for the state array shown in FIG. 2.

Referring to FIG. 3, an instance of the bit array 250 is shown. In the example of FIG. 3, the bit array 250 has twenty entries 260 (numbered 0 to 19, wherein N=20), and the entries 260 contain only status bits 262. For those entries 260 having a corresponding packet stored in the jitter buffer 290, the status bit 262 is set high (e.g., a 1-bit), whereas for those entries 260 having no corresponding packet in the jitter buffer 290, the status bit 262 is set low (e.g., a 0-bit). The get pointer 270 points to the entry 260 numbered "4" of the bit array 250, thereby indicating to the play-out process 600 that the packet corresponding to this entry is next-in-line for play-out. The put pointer 280 points to the entry 260 numbered "14" of bit array 250, which informs the insertion process 400 that the packet corresponding to this entry has the highest sequence number (HSN 220) of all packets stored in the jitter buffer 290.

As will be described in more detail below, when the put pointer 280 reaches the last entry 260 (numbered "19" in FIG. 3) of bit array 250, the put pointer 280 will wrap around to the first entry 260 (numbered "0") of bit array 250. This wrap-around effect is illustrated in FIG. 3 by the copy 250' (shown in dashed line) of the instance of the bit array 250, which copy 250' is shown juxtaposed end-to-end with the illustrated instance of the bit array 250. The get pointer 270 will wrap around in a similar fashion.

If a packet arrives at receiving system 10 having a sequence number less than that of the packet identified by the get pointer 270, the packet has missed its "opportunity" to be played out. In other words, that packet should already have been played out and, therefore, the packet is too late and will not be accepted. If a packet arrives having a sequence number lying between the sequence number of the packet identified by the get pointer 270 and that of the packet identified by the put pointer 280—this range being designated by reference numeral 310—that packet is timely and will be accepted. However, if a packet arrives having a sequence number greater than the sequence number of the packet identified by the put pointer 280 (i.e., the HSN 220), that packet may be accepted if there is memory space available in the jitter buffer 290. Starting from the put pointer 280 and moving forward through the bit array 250 towards the get pointer 270 and, if necessary, wrapping around to the start of the bit array 250—this range being designated by reference numeral 320—if there are open entries in the bit array 250, then memory space is available in the jitter buffer 290 to receive additional packets. If, however, a packet is received having a sequence number lying outside this range 320, the packet is too early and will not be accepted.

The combination of the ranges 310, 320 in which packets will be accepted defines a range of sequence numbers, or acceptance window 330, within which packets will be accepted. Those packets that are either too late or too early—i.e., those packets not having sequence numbers falling within the acceptance window 330—will not be accepted and stored in the jitter buffer 290. The width of the acceptance window 330 equals N−1.

Figure 4:
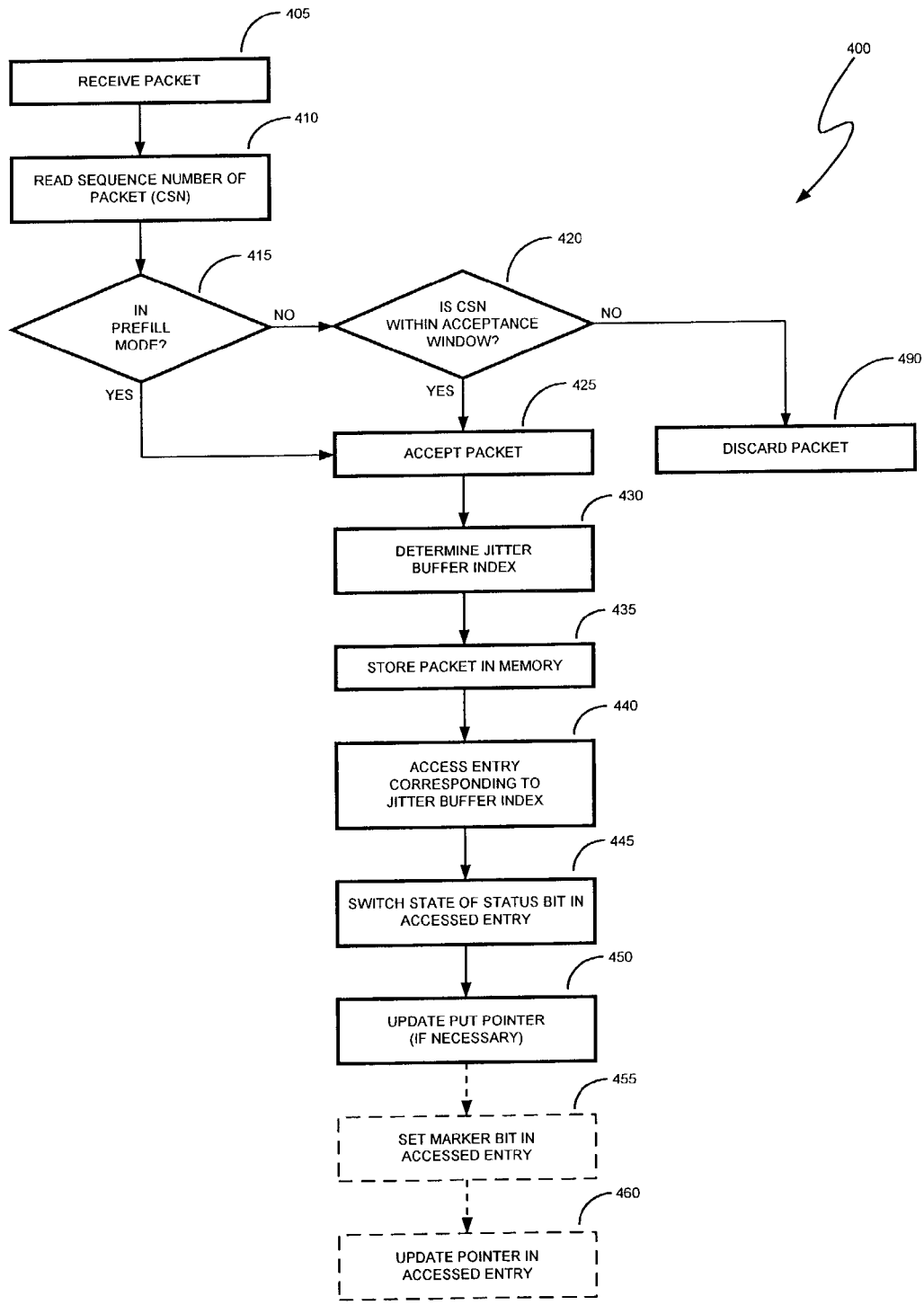
FIG. 4 is a block diagram illustrating an embodiment of a packet insertion process that may handshake with the state array of FIG. 2.

Referring now to FIG. 4, an embodiment of the packet insertion process 400 is illustrated. As shown at block 405, a packet is received at the receiving system 10. The network interface 110 will forward the packet to one of the packet processing engines 120, which will hold the received packet in its local memory 122. Generally, the packet will form part of a stream of packets or flow, and one of the jitter buffers 290a-k and its associated state array 200a-k will handle all packets associated with this flow of information.

The processing engine 120 will read the sequence number of the packet, as shown at block 410. The sequence number of the packet currently being processed corresponds to the CSN 230. Note that if this packet were the first packet of the flow to be received at receiver 10, the sequence number of this first packet would be stored in the state array 200 as the FSN 210. Also, if this packet has the highest sequence number of all received packets of the flow, the sequence number of this packet would be stored in the state array 200 as the HSN 220 (insertion of this packet would also cause the put pointer 280 to move forward, as will be explained below).

In one embodiment of the insertion process 400, as shown at block 415 in FIG. 4, it may then be determined whether the receiving system 10 is operating in a "prefill mode." As will be described in more detail below, to insure a minimum or threshold number of packets are available for play-out, the receiving system 10 may operate in the "prefill mode." In such a prefill mode, the receiving system 10 delays play-out of a packet flow until a threshold number of packets associated with the flow has been received and stored in a corresponding jitter buffer 290. If the receiving system 10 is operating in the prefill mode, the received packet is accepted, as illustrated at block 425. Always accepting received packets when the receiving system 10 is operating in the prefill mode insures that initially—i.e., when the get pointer 270 and put pointer 280 are equivalent—no packet will be rejected for failing to lie inside the acceptance window. Also, the automatic acceptance of packets while in the prefill mode may help to compensate for a system failure causing the loss of a large number of packets in a jitter buffer 290.

If, however, the receiving system 10 is not operating in the prefill mode—see block 415—it is then determined whether the CSN of the received packet lies within the acceptance window, as shown at block 420. A method of determining if the sequence number of a packet lies within the acceptance window is illustrated and described below. If the CSN 230 is outside the acceptance window, the packet is discarded (as being either too early or too late), as shown at block 490. Conversely, if the CSN 230 lies within the acceptance window, the packet is accepted, as denoted by block 425.

If a packet is accepted (see block 425), that packet's "jitter buffer index" is determined, as illustrated at block 430. The jitter buffer index comprises any index or variable that identifies the entry 260 of bit array 250 that corresponds to the received packet, wherein the received packet, if accepted, is stored in the jitter buffer index 290 at a memory location associated with this entry 260 of the bit array (or at a memory location identified by a pointer 264 contained in this entry 260). In one embodiment, the jitter buffer index comprises a normalized sequence number having a value between 0 and N−1, wherein N is the total number of entries 260 in the bit array 250, as noted above.

Figure 5:
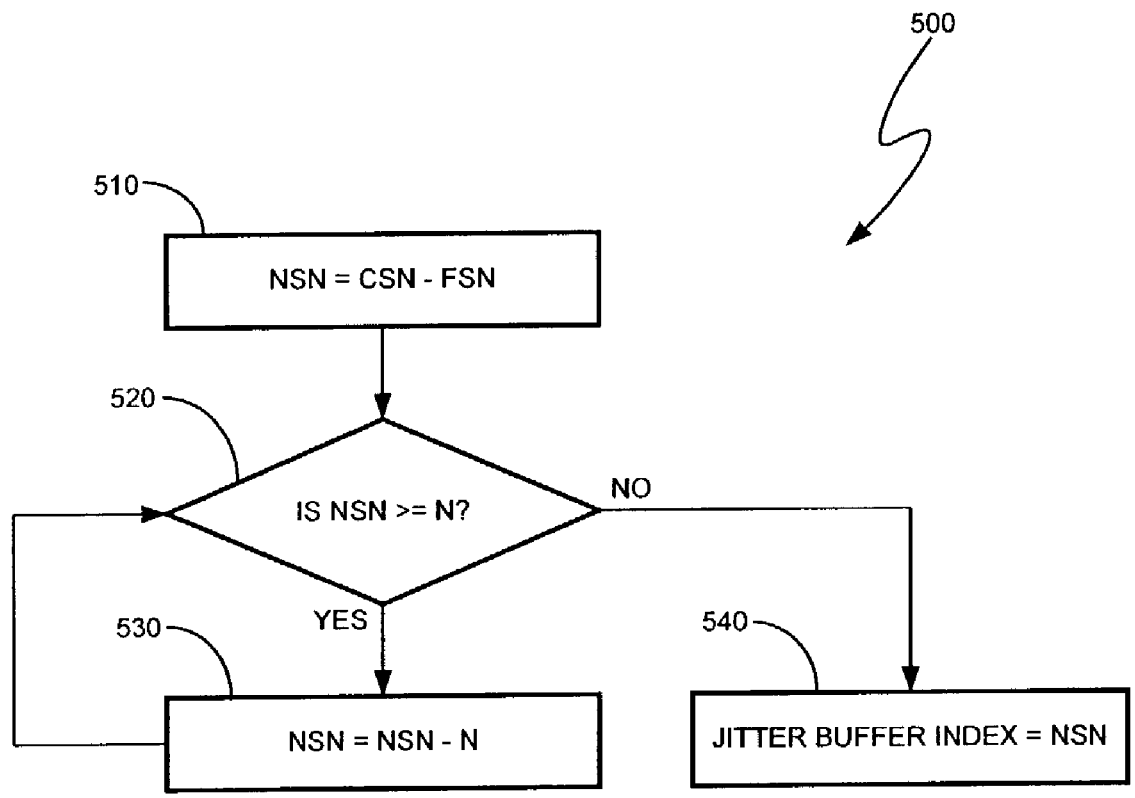
FIG. 5 is a block diagram illustrating an embodiment of a method of determining a jitter buffer index.

One embodiment of a method 500 of determining a jitter buffer index is shown in FIG. 5. Referring to block 510 in FIG. 5, the FSN 210 is subtracted from the CSN 230 to determine a normalized sequence number, or NSN. If the NSN is less than N—see block 520—the jitter buffer index equals the NSN. If, however, the NSN is greater than or equal to N, the value of N is subtracted from the NSN and the process is repeated. The method 500 will continue to subtract the value of N from the NSN until the NSN equals a value that is less than N (this process of reducing all sequence numbers to a value between 0 and N−1 is referred to as modulo N arithmetic). When the NSN is less than N, the jitter buffer index is equal to the NSN (see block 540).

Referring back to FIG. 4, the received packet is then stored in the jitter buffer 290, as shown at block 435. As illustrated at block 440, the entry 260 of bit array 250 corresponding to the jitter buffer index is accessed. For example, referring to FIG. 3, if the jitter buffer index equals the number seventeen (17), the entry 260 numbered "17" of bit array 250 is accessed (see arrow 305 in FIG. 3). The received packet is stored (see block 435) in the jitter buffer 290 at a memory location associated with the accessed entry 260 (i.e., the entry numbered "17") of the bit array 250.

Referring to block 445, the state of the status bit 262 in the accessed entry 260 is switched—e.g., from low to high—to indicate that the entry now has a corresponding packet stored in the jitter buffer 290 associated with the state array 200. If necessary, the put pointer 280 is updated, as shown at block 450. If the CSN 230 exceeds the HSN 220—i.e., the received packet has a sequence number exceeding the sequence numbers of all other packets stored in jitter buffer 290—the put pointer 280 will be updated to identify the entry 260 corresponding to the newly inserted packet, which packet corresponds to the HSN 220.

If marker bits are being used, the marker bit of a received packet may be read while the packet is stored in the local memory 122 of the packet processing engine 120 that has received the packet. Again, the marker bit will indicate whether the received packet is the first packet following a period of silence. If the marker bit of the packet is set high—thereby indicating that the packet follows a period of silence—a MRKR BIT 264 in the corresponding entry 260 (i.e., the entry corresponding to the packet's jitter buffer index, as described above) is set high (e.g., a 1-bit), as shown at block 455. Setting the MRKR BIT 264 of the corresponding entry 260 high will inform the packet play-out process 600 that the associated packet stored in jitter buffer 290 is the first packet following a period of silence.

In another embodiment, as shown by block 460, a pointer 266 in the accessed entry 260 is updated to identify a memory location of the newly inserted packet within jitter buffer 290. As set forth above, pointers 266 may be necessary where packets are stored in the jitter buffer 290 at arbitrary memory locations.

Figure 6:
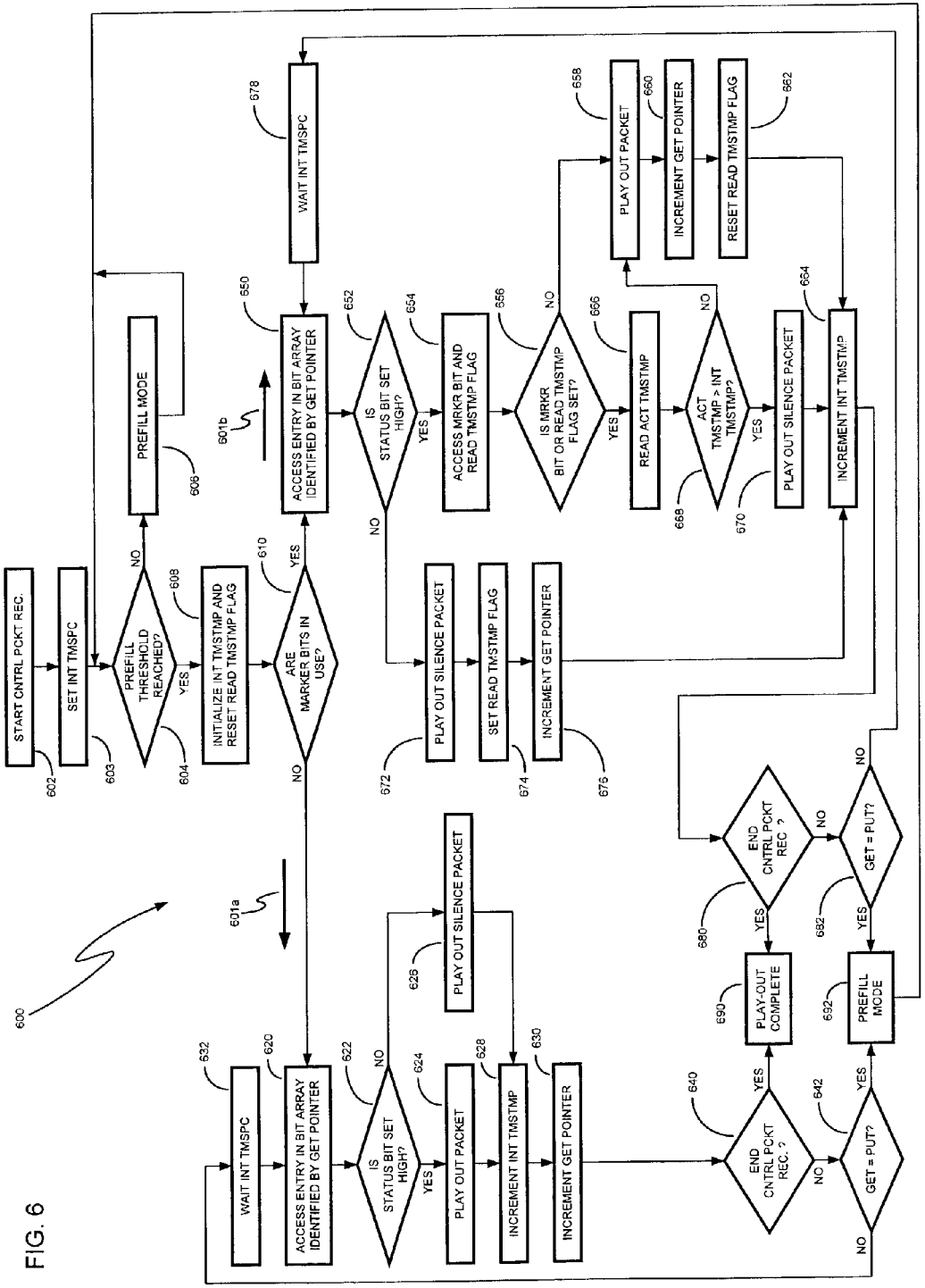
FIG. 6 is a block diagram illustrating an embodiment of a packet play-out process that may handshake with the state array of FIG. 2.

An embodiment of the packet play-out process 600 is shown in FIG. 6. The packet play-out process 600 and the packet insertion process 400 described above may be executed on the same processing device (e.g., processing device 100). Alternatively, the packet play-out process 600 and the packet insertion process 400 may be executed on separate processing devices, respectively. It should be understood, however, that the packet insertion and play-out processes 400, 600 may be executed in any other suitable manner using any suitable device, combination of devices, circuitry, and/or logic.

The play-out process 600 may play out from a jitter buffer 290 (or multiple jitter buffers) a sequence of packets associated with a flow of packets. Generally, a flow of packets comprises a series of packets associated with a message being received from one sending system 20. Typically, the sending system initializes a flow of packets by transmitting a "start" control packet (START CNTRL PCKT), which is received by the receiving system 10, as illustrated at block 602.

Conventionally, to ensure packets are played out at the appropriate time, timestamps were read and verified during the play-out routine. As noted above, reading the timestamp of a packet stored in an off-chip jitter buffer is a high latency process. However, because the bit array 250 maintains the correct ordering of all packets and, further, because the bit array 250 references only valid packets (i.e., only those packets within the acceptance window are stored in the jitter buffer 290), it can be assumed during the play-out process 600 that timestamps linearly increase by a uniform time spacing. This is generally a valid assumption as long as an uninterrupted sequence of packets is available in the jitter buffer 290. If marker bits are being used, it is only when a packet was missing in the jitter buffer 260, or when there has been a period of silence, that the play-out process 600 needs to access a packet in the jitter buffer 290 to read the packet's timestamp. If marker bits are not in use, timestamps will generally not be read from packets stored in the jitter buffer 290. Thus, assuming linearly increasing timestamps, once a time spacing between packets has been determined for a flow of packets, that time spacing may be applied to all packets in the flow during play-out. This uniform time spacing corresponds to the internal time spacing or INT TMSPC 225 described above.

Referring to block 603 in FIG. 6, the internal time spacing or INT TMSPC is set for the flow of packets. The internal time spacing for the packet flow may be obtained from the START CNTRL PCKT provided by the sending system 20 to initialize that particular flow of packets, wherein this internal time spacing is generally based upon a selected protocol. As noted above, the INT TMSPC 225 may be stored in the state array 200. The INT TMSPC is applied to all packets in the packet flow being played out.

Prior to commencing play-out of a packet stream, it may be desirable to insure a minimum number of packets are available (i.e., stored in a jitter buffer 290), such that a continuous stream of packets may be played out without pauses or periods of silence. To insure a minimum or threshold number of packets are available for play-out, the receiving system 10 may operate in the above-described "prefill mode." In the prefill mode, the receiving system 10 delays play-out of a packet flow until a threshold number of packets associated with the flow—or "prefill threshold"—has been received and stored in a corresponding jitter buffer 290. The threshold number of packets is selected to insure a continuous stream of packets will be available to the play-out process 600 once play-out begins. During the prefill mode, the receiving system 10 may play out silence packets. When the threshold number of packets has been received, play-out of the packet flow commences. Accordingly, referring to block 604 in FIG. 6, if the prefill threshold has not been achieved, the receiving system 10 operates in a prefill mode, as shown at block 606. When the prefill threshold is reached—refer again to block 604—the play-out of packets may begin. Determining whether the prefill threshold has been achieved may be accomplished by monitoring the status bit 262 of each entry 260 of the bit array 250 and, when the total number of status bits 262 set high equals the threshold number of packets, the prefill threshold has been reached.

Referring now to block 608, assuming the prefill threshold has been achieved, the internal timestamp or INT TMSTMP is initialized. By way of example, the internal timestamp may initially be set equal to a timestamp read from a first received packet. As previously described, the internal timestamp of a packet represents a timestamp that has been inferred for that packet based, at least in part, upon the packet's relative position within the state array 200. Also, as illustrated in block 608, the READ TMSTMP FLAG 220 is reset. The function of the READ TMSTMP FLAG 220 is described in detail below. Both the INT TMSTMP 230 and READ TMSTMP FLAG 220 may be stored in the state array 200, as noted above.

Referring to block 610, it is then determined whether marker bits will be used for the flow of packets. Generally, the control packet sent to initialize the flow of packets will indicate whether marker bits are being used. For ease of understanding, arrows 601a, 601b have been added to FIG. 6. If marker bits are not in use, the play-out process 600 follows the path indicated by arrow 601a, whereas if marker bits are being used, the play-out process 600 follows the path indicated by arrow 601b.

Following the path identified by arrow 601a, wherein marker bits are not being used, the entry 260 of bit array 250 that is identified by the get pointer 270 is accessed to read the status bit 262, as illustrated at block 620. If the status bit 262 is set high—see block 622—the accessed entry 260 has a corresponding packet stored in the associated jitter buffer 290. Referring to block 624, the packet corresponding to the accessed entry 260 of the bit array 250 is played out from the jitter buffer 290. During play-out, the receiving system 10 may provide the packet to an output device (e.g., a telephone, a speaker, a video monitor, etc.). However, referring again to block 622, if the status bit 262 is set low—thereby indicating that no corresponding packet is stored in the associated jitter buffer 290—a silence packet is played out, as shown at block 626. A silence packet provides a period of null signal (e.g., zero volume, no picture, etc.), whether the signal is audio, video, or a combination thereof.

Whether a packet has been played out (see block 624) or a silence packet has been played out (see block 626), the internal timestamp (INT TMSTMP) is incremented, as shown at block 628. The internal timestamp is incremented by an amount equal to the internal time spacing (INT TMSPC). Further, as illustrated at block 630, the get pointer 270 is incremented to identify the next entry 260 of bit array 250, this entry 260 corresponding to a packet that is next-in-line to be played out (if that packet is stored in the jitter buffer 290).

The play-out process 600 may be completed upon receipt of an "end" control packet (END CNTRL PCKT) from the sending system 20 indicating that the packet flow is done. Thus, referring to block 640, if such an END CNTRL PCKT is received, the play-out is complete, as shown at block 690. The play-out process 600 may also be halted if the get pointer 270 catches up with the put pointer 280 (see block 642), in which instance the receiving system 10 may return to the prefill mode, as illustrated at block 692. When the get pointer 270 catches up with the put pointer 280, the receiving system 10 has essentially run out of packets associated with the flow being played out. Referring again to block 604, operation in the prefill mode may be terminated in response to the prefill threshold being achieved.

Assuming that the get pointer 270 has not caught up with the put pointer 280 and, further, that no control packet indicating completion of the flow has been received, the play-out process 600 continues for all other packets in the flow of packets. However, prior to accessing another entry 260 of the bit array 250 (see block 620) and its corresponding packet (if any) in the associated jitter buffer 290, the receiving system 10 will wait for a period of time equivalent to the internal time spacing (INT TMSPC), as illustrated at block 632. By delaying for a period of time corresponding to the internal time spacing, the play-out of a packet is separated in time from the previous packet, as well as from the next-in-line packet, by the internal time spacing. Thus, each packet will be played out at the correct time, this time corresponding to the inferred timestamp (i.e., the internal timestamp) for that packet.

Referring back to block 610 and following the path identified by arrow 601b, wherein marker bits are being used, the entry 260 of bit array 250 that is identified by the get pointer 270 is accessed to read the status bit 262, as illustrated at block 650. If the status bit 262 is set high—see block 652—the accessed entry 260 has a corresponding packet stored in the associated jitter buffer 290. If the status bit 262 is set high, the MRKR BIT 264 is read from the accessed entry 260 of bit array 250, and the READ TMSTMP FLAG 220 is read from the state array 200 (see FIG. 2), both as shown at block 654. If the MRKR BIT 264 is set high, the corresponding packet in jitter buffer 290 is the first packet following a period of silence. As will be explained below (see block 674), the READ TMSTMP FLAG 220 is set (e.g., by setting it high) to indicate that a packet in the packet flow was missing. For either of a first packet following a period of silence or a first packet following a missing packet, the actual timestamp (ACT TMSTMP) of this packet is read to verify synchronization between packets.

Referring to block 656, if the MRKR BIT 264 is not set to indicate the corresponding packet in the jitter buffer 290 is the first packet following a period of silence and, further, the READ TMSTMP FLAG 220 is not set to indicate that a prior packet was missing, the corresponding packet may be played out from the jitter buffer 290, as shown at block 658. As illustrated at block 660, the get pointer 270 is incremented to identify the next entry 260 of bit array 250, this entry 260 corresponding to a packet that is next-in-line to be played out (if that packet is stored in the jitter buffer 290).

Referring to block 662, the READ TMSTMP FLAG 220 is reset if necessary. As noted above, this flag is set to indicate that a missing packet has occurred and that the next packet in the flow needs to be accessed to read and verify the timestamp. If a packet corresponds to the first packet following a missing packet, and this packet is played out (see block 658), the READ TMSTMP FLAG 220 is reset (e.g., from a 1-bit to a 0-bit) to clear this event, such that the packet next-in-line for play-out is not accessed to read its timestamp (unless the MRKR BIT 264 is set to indicate this packet is the first packet following a period of silence, which is described in more detail below).

As illustrated at block 664, the internal timestamp (INT TMSTMP) is incremented. Again, the internal timestamp is incremented by an amount equal to the internal time spacing (INT TMSPC), and both the INT TMSTMP 230 and INT TMSPC 225 may be stored in the state array 200.

Referring again to block 656, if the MRKR BIT 264 is set high to indicate the corresponding packet in jitter buffer 290 is the first packet following a period of silence, or if the READ TMSTMP FLAG 220 is set high to indicate that the corresponding packet is the first packet following a missing packet, the corresponding packet is accessed in jitter buffer 290 to read the actual timestamp (ACT TMSTMP) therefrom, as denoted by block 666. Generally, because any missing packet may have included a marker bit indicating that the packet followed a period of silence, the actual timestamp will always be read from the first packet following the missing packet (or packets), the READ TMSTMP FLAG 220 indicating that a packet (or packets) is missing. The process of accessing a packet stored in an off-chip jitter buffer increases latency, as noted above. However, for the state-based jitter buffer described herein, it will only be necessary to read the actual timestamp from a packet stored in the jitter buffer when there is missing packet or a period of silence (if marker bits are being used). Assuming a "well-behaved" network, instances of missing packets should be minimal, and the number of times the play-out process 600 must read a timestamp from memory as a result of missing packets relatively small. Instances of periods of silence are a function of the behavior of the sending system 20, as well as the message being transmitted.

Prior to play-out of the packet from the jitter buffer 290, whether the appropriate time for play-out has arrived needs to be determined. If the internal timestamp and the actual timestamp of the packet correspond to one another (they may not precisely coincide or be exactly equal), the time for play-out of the packet has arrived. If, however, the actual timestamp is greater than the internal timestamp, it is not yet time for play-out of that packet. Thus, referring to block 668, if the actual timestamp (ACT TMSTMP) is greater than the internal timestamp (INT TMSTMP), a silence packet is played out, as illustrated at block 670. As shown at block 664, the internal timestamp is incremented by the internal time spacing. It should be noted that, when the actual timestamp is greater than the internal timestamp (see block 668) and a silence packet is played out (see block 670), the get pointer 270 is not incremented (i.e., it still points to the entry 260 that was just accessed). The get pointer 270 should not advance until the packet corresponding to the entry 260 to which the get pointer 270 currently identifies has been played out.

Referring now back to block 652, where the status bit 262 is set low to indicate no packet corresponding to the accessed entry 260 is stored in the jitter buffer 290, there is a missing packet in the flow of packets. Because there is no packet to be played out and, further, to insure synchronization during the play-out process, a silence packet is played out, as illustrated at block 672. To inform the play-out process that a packet was missing and that the next available packet is the first packet following a missing packet—thereby necessitating an access to the jitter buffer 290 to read the actual timestamp of the packet (see blocks 656 and 666)—the READ TMSTMP FLAG 220 needs to be set (e.g., by setting this flag high) to indicate that the timestamp of the next available packet will be read to insure synchronization during play-out, which is illustrated at block 674.

As shown at block 676, the get pointer 270 is incremented to identify the next entry 260 of bit array 250, this entry 260 corresponding to a packet that is next-in-line to be played out (if that packet is stored in the jitter buffer 290). Referring again to block 664, the internal timestamp is incremented by the internal time spacing, as previously described.

As noted above, the play-out process 600 may be completed upon receipt of an END CNTRL PCKT from the sending system 20 indicating that the packet flow is done. Thus, referring to block 680, if such a control packet is received, the play-out is complete, as shown at block 690. Also as noted above, the play-out process 600 may be halted if the get pointer 270 catches up with the put pointer 280 (see block 682), in which instance the receiving system 10 may return to the prefill mode, as illustrated at block 692. Referring again to block 604, operation in the prefill mode may be terminated in response to the prefill threshold being achieved.

Assuming that the get pointer 270 has not caught up with the put pointer 280 and, further, that no END CNTRL PCKT indicating completion of the flow has been received, the play-out process 600 continues for all other packets in the flow of packets. However, prior to accessing another entry 260 of the bit array 250 (see block 650) and its corresponding packet (if any) in the associated jitter buffer 290, the receiving system 10 will wait for a period of time equivalent to the internal time spacing (INT TMSPC), as illustrated at block 678. Once again, by delaying for a period of time corresponding to the internal time spacing, the play-out of a packet is separated in time from the previous packet, as well as from the next-in-line packet, by the internal time spacing. Thus, each packet will be played out at the correct time, this time corresponding to the inferred timestamp (i.e., the internal timestamp) for that packet.

Figure 7A:
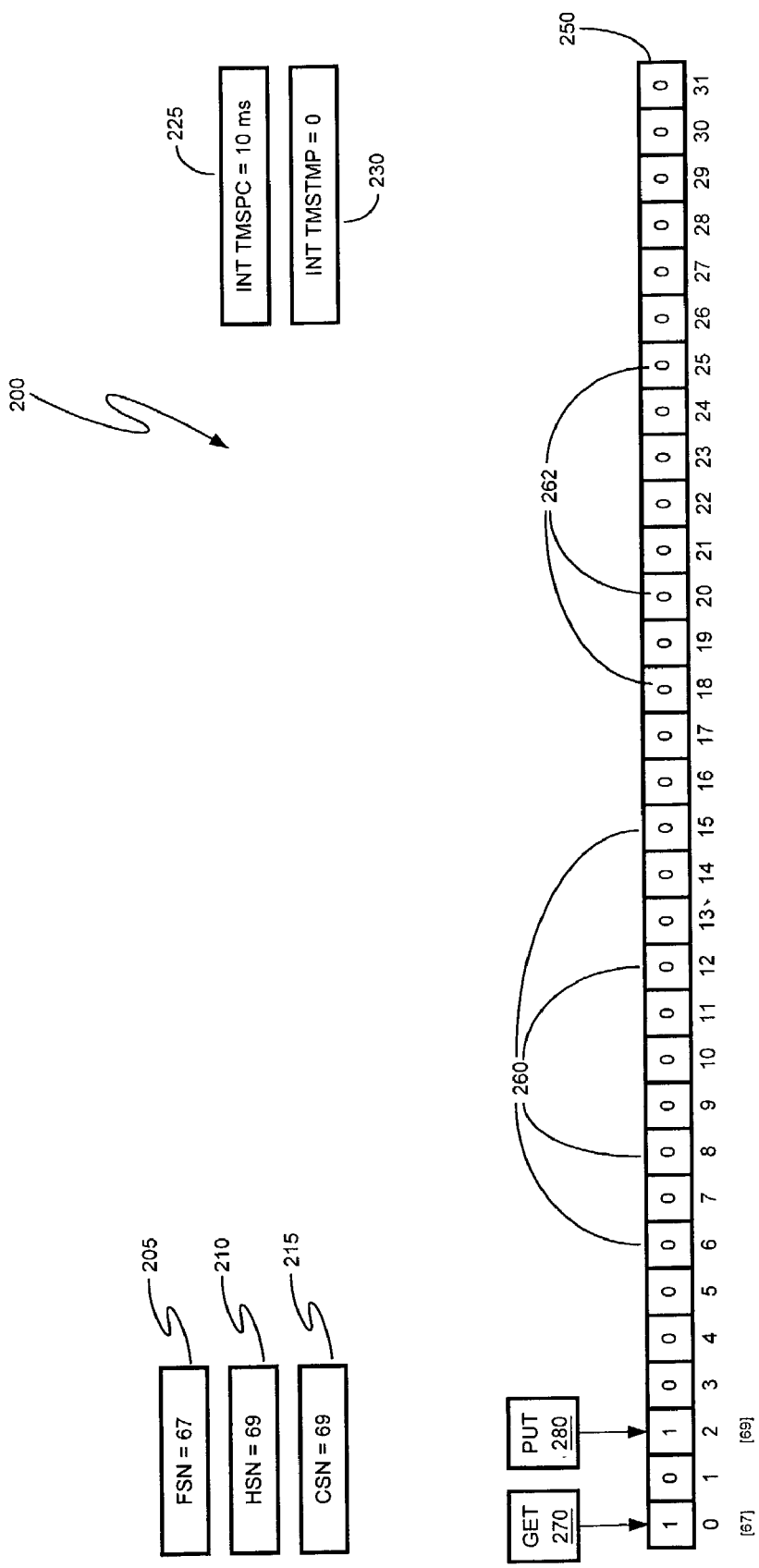
FIGS. 7A-F are schematic diagrams illustrating specific examples of the insertion process of FIG. 4 and the play-out process of FIG. 6.

The embodiments of the packet insertion process 400 and the packet play-out process 600 may be better understood by reference to the example illustrated in FIGS. 7A-F. Referring to FIG. 7A, the state array 200 has a bit array 250 including thirty-two (32) entries 260 (numbered 0 to 31, wherein N=32), each entry 260 having a status bit 262. In the example of FIGS. 7A-F, marker bits will not be used, and the MRKR BIT 264 of each entry 260 is not illustrated. Further, the entries 260 of the bit array 250 shown in FIGS. 7A-F do not include pointers 266—i.e., packets are stored in contiguous memory locations of the associated jitter buffer 290 (not shown in FIGS. 7A-F)—however, the present example is applicable to a bit array including pointers.

The state array 200 stores the FSN (first sequence number) 205 and the HSN (highest sequence number) 210, and the state array 200 may also store the CSN (current sequence number) 215, all as described above. The INT TMSPC 225 and the INT TMSTMP 230 may also be stored in the state array 200. For the example of FIGS. 7A-F, the INT TMSPC 225 is set to 10 ms; however, it should be understood that the internal time spacing may be set to any suitable value (depending upon, for example, the protocol being used). For this example, it will be assumed that the first received packet has a timestamp of zero and, therefore, the INT TMSTMP 230 is initially set to zero. Because the example of FIGS. 7A-F does not use marker bits, the READ TMSTMP FLAG 220 is not shown.

All entries 260 of the bit array 250 are initially set low, indicating that the associated jitter buffer 290 is devoid of packets. A first packet is then received at the receiving system 10 (see block 405 in FIG. 4) and the sequence number of this packet is read (see block 410). The sequence number of the first received packet is sixty-seven (67), and the FSN 205 is set equal to this number. At this juncture, the CSN 215 would also be equal to the first packet sequence number (i.e., 67), as the first packet is currently being processed. Initially, when the jitter buffer 290 is empty—i.e., the get pointer 270 is equivalent to the put pointer 280—the receiving system 10 may be operating in a prefill mode (see block 415), and the first packet will be accepted (see block 425).

To store the packet, the jitter buffer index of the received packet is determined (see block 430). Referring back to FIG. 5, a normalized sequence number (NSN) is calculated (see block 510) by subtracting the FSN from the CSN. For the first received packet, the FSN and CSN are equal and, therefore, the NSN equals zero (0). If the NSN is greater than or equal to N (i.e., 32)—see block 520—the value of N is subtracted from the NSN (see block 530), and this process is repeated until the NSN is less than N. If the NSN is less than N, the jitter buffer index equals the NSN (see block 540). Thus, for the first received packet having a NSN of zero, the jitter buffer index equals zero (0).

The first received packet is stored in the jitter buffer 290 (see block 435). The entry 260 of bit array 250 corresponding to the jitter buffer index is then accessed (see block 440). Therefore, the entry 260 of bit array 250 numbered "0" is accessed, and the state of the status bit 262 in the accessed entry 260 is switched (see block 445). For example, as illustrated in FIG. 7A, the state of the status bit 262 in the corresponding entry is switched from low (i.e., a 0-bit) to high (i.e., a 1-bit). The high status bit will indicate that a packet corresponding to the entry 260 numbered "0" is stored in the jitter buffer 290. With only one entry 260 of bit array 250 having a corresponding packet in jitter buffer 290, both of the get and put pointers 270, 280 will point to the single entry (i.e., the get pointer 270 is equivalent to the put pointer 280).

As noted above, the first received packet is stored in the jitter buffer 290 (see block 435). Thus, there is a packet stored in the jitter buffer 290 having a sequence number of sixty-seven (67) and a jitter buffer index of zero (0). This packet is identified or referenced by a corresponding entry 260 of bit array 250, the corresponding entry comprising that entry having a number equal to the packet's jitter buffer index (i.e., 0). The status bit 262 of this corresponding entry 260 is set high to indicate that such a packet is stored in the jitter buffer 290. In FIGS. 7A-F, the number of an entry 260 is shown below that entry and, if a packet stored in jitter buffer 290 is referenced by that entry, the packet's sequence number is shown below the entry number (the sequence number enclosed in brackets).

Still referring to FIG. 7A, a second packet is received at receiving system 10 (see block 405). The sequence number of the second packet is read (see block 410). The second packet's sequence number is sixty-nine (69), and this sequence number becomes the CSN 215. With only a single packet having been received, the receiving system 10 may still be operating in the prefill mode (see block 415), and the second packet is accepted (see block 425).

The jitter buffer index of the second packet is then determined (see block 430). The NSN for the second packet equals two (2)—CSN equal to sixty-nine (69), whereas the FSN remains sixty-seven (67)—and, therefore, the jitter buffer index for the second packet is two (see FIG. 5). The second received packet is then stored in the jitter buffer 290 (see block 435). The entry 260 of bit array 250 numbered "2" is accessed and the status bit 262 thereof set high (see blocks 440, 445) to indicate the second packet is stored in the jitter buffer 290. The put pointer 280 is updated (see block 450) to identify the entry 260 of bit array 250 corresponding to the second packet—i.e., the entry numbered two (2) corresponding to a packet having a jitter buffer index of two (2) and a sequence number of sixty-nine (69)—as shown in FIG. 7A.

If the entries 260 of bit array 250 included MRKR BITS 264 and marker bits are being used, each of the packets (having sequence numbers 67 and 69) would be accessed while stored in the local memory 122 of one of the packet processing engines 120 and the state of each packet's marker bit determined. The state of the MRKR BIT 264 in each packet's corresponding entry 260 (i.e., the entries number "0" and "2") of bit array 250 would be set to reflect whether that packet is the first packet following a period of silence (see block 455). Also, if each of the accessed entries 260 were to include a pointer 266, the pointer would be updated to reflect the packet's memory location in jitter buffer 290 (see block 460).

Figure 7B:
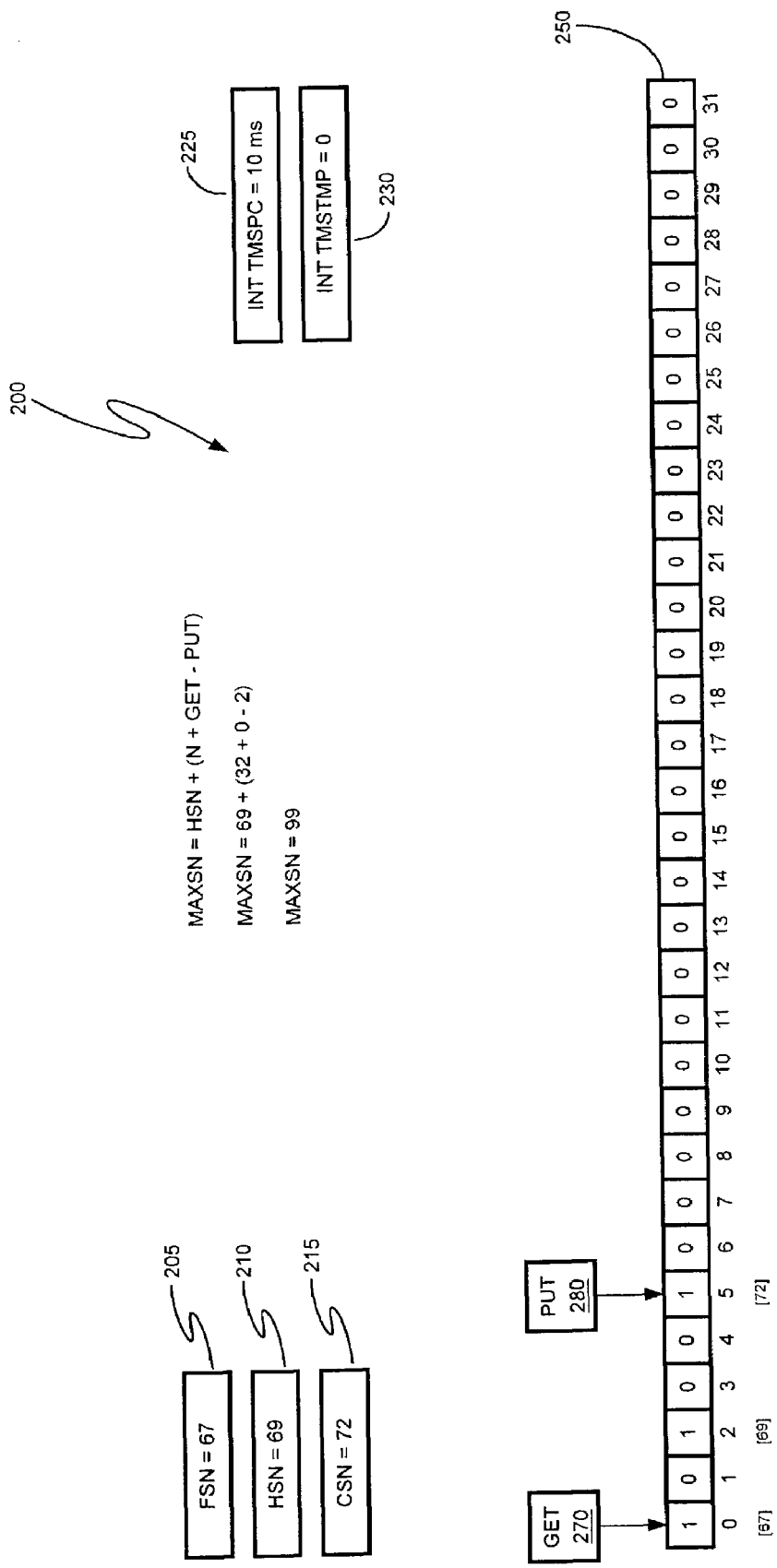

Turning now to FIG. 7B, a third packet has been received at the receiving system 10, and the sequence number of the third packet is read (see blocks 405, 410). The sequence number of the third received packet is seventy-two (72), and the CSN is now equal to this sequence number. It will now be assumed that the receiving system 10 is no longer in the prefill mode—i.e., the prefill threshold has been achieved—and it is then determined whether the CSN falls within the acceptance window of the bit array 250 (see blocks 415, 420).

Figure 8:
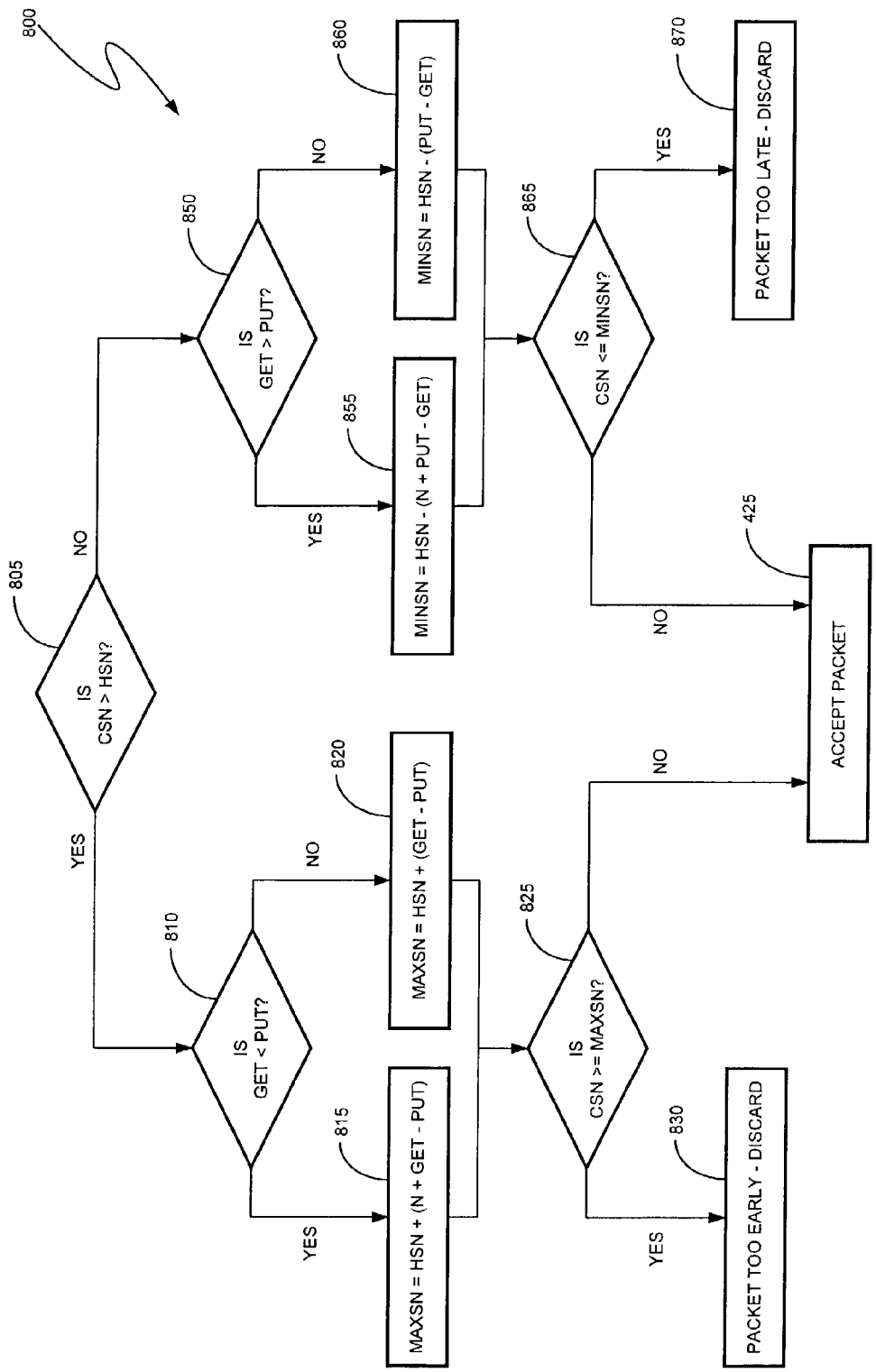
FIG. 8 is a block diagram illustrating an embodiment of a method of determining whether a received packet's sequence number is within the acceptance window.

Illustrated in FIG. 8 is an embodiment of a method 800 of determining whether the sequence number of a packet lies within the acceptance window. Referring to block 805, if the CSN is greater than the HSN, it is determined whether the packet is too early (see blocks 810 through 830), whereas if the CSN is less than the HSN, it is determined whether the packet is too late (see blocks 850 through 870). Returning to the example above, the CSN (i.e. 72) exceeds the HSN (i.e., 69, which is the sequence number of the second received packet); therefore, whether the packet is too early will be determined.

If a packet is potentially too early, the method 800 of FIG. 8 will determine a maximum sequence number (MAXSN) and, if the CSN is greater than or equal to the MAXSN, the packet is too early (i.e., there is no memory space in the jitter buffer to store the packet). If the get pointer 270 (GET) is less than the put pointer 280 (PUT)—see block 810—the MAXSN may be determined as shown in block 815; otherwise, when the get pointer 270 exceeds the put pointer 280, the MAXSN may be determined as shown in block 820. Returning to the above example, the get pointer 270 points to the entry 260 numbered "0" and the put pointer 280 points to the entry 260 numbered "2"—see FIG. 7A—and, therefore, GET is less than PUT. The MAXSN is determined according to block 815, the MAXSN being equal to ninety-nine (99), as shown in FIG. 7B.

Referring to block 825 in FIG. 8, if the CSN is greater than or equal to the MAXSN, the packet is too early, as shown at block 830. Conversely, if the CSN is less than the MAXSN, the packet lies within the acceptance window and will be accepted, as illustrated at block 425. In this instance, the CSN (i.e., 72) is less than the MAXSN (i.e., 99) and, accordingly, the third received packet is accepted. Thus, although the jitter buffer index of the third received packet does not lie between the get and put pointers 270, 280 (see FIG. 7A), sufficient memory space is available in the jitter buffer 290 and the third packet is accepted for storage therein.

The jitter buffer index of the third packet (having a sequence number of 72) is five (5)—see block 430—and the entry 260 numbered "5" is accessed to switch the state of the status bit 262 (see blocks 440, 445), thereby indicating that the entry numbered "5" of bit array 250 has a corresponding packet (i.e., the third packet) that has been stored in the jitter buffer 290 (see block 435). The put pointer 280 is then updated to identify this entry 260 of bit array 250 (see block 450), wherein this entry 260 corresponds to that entry numbered "5" and referencing a packet having a jitter buffer index of 5 and a sequence number of 72.

Figure 7C:
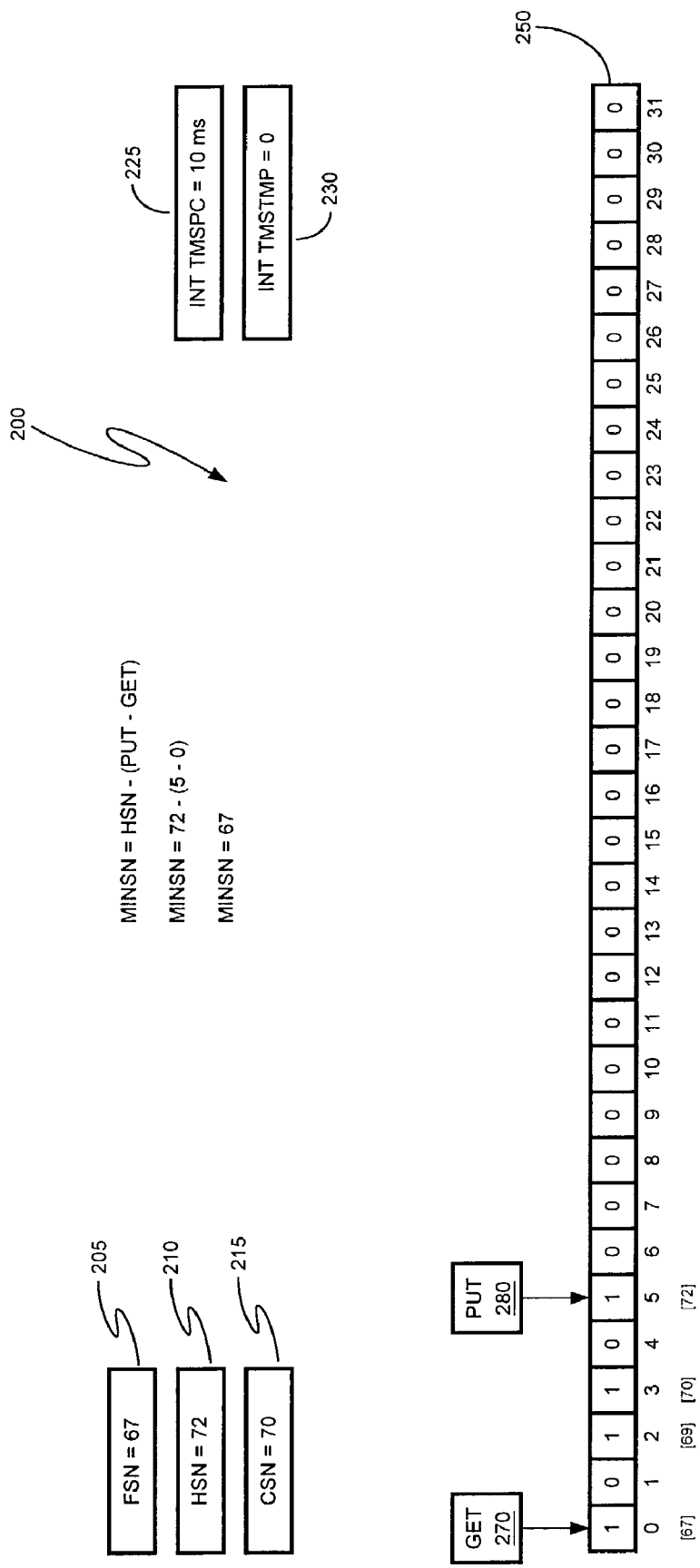

In FIG. 7C, a fourth packet having a sequence number of seventy (70) has been received (i.e., the CSN equals 70). Referring again to FIG. 8 to determine whether the fourth packet has a sequence number within the acceptance window, the CSN (i.e., 70) is less than the HSN (i.e., 72)—see block 805—and, therefore, whether the fourth packet is too late needs to be determined.

If a packet is potentially too late, the method 800 of FIG. 8 will determine a minimum sequence number (MINSN) and, if the CSN is less than or equal to the MINSN, the packet is too late (i.e., the packet having the next highest sequence number has already been played out). If the get pointer 270 (GET) exceeds the put pointer 280 (PUT)—see block 850—the MINSN may be determined as shown in block 855; otherwise, when the get pointer 270 is less than the put pointer 280, the MINSN may be determined as shown in block 860. Returning to the above example, the get pointer 270 points to the entry 260 numbered "0" and the put pointer 280 points to the entry 260 numbered "5" and, therefore, GET is less than PUT. The MINSN is determined as shown in block 860, the MINSN being equal to sixty-seven (67), as shown in FIG. 7C.

Referring to block 865 in FIG. 8, if the CSN is less than or equal to the MINSN, the packet is too late, as shown at block 870. Conversely, if the CSN is greater than the MINSN, the packet lies within the acceptance window and will be accepted, as illustrated at block 425. In this instance the CSN (i.e., 70) exceeds the MINSN (i.e., 67); therefore, the fourth received packet is accepted. The jitter buffer index of the fourth packet (having a sequence number of 70) is three (3), and the entry 260 of bit array 250 numbered "3" is accessed to switch the state of the status bit 262 (see blocks 430, 440, 445), thereby indicating that the entry 260 numbered "3" has a corresponding packet (i.e., the fourth packet) that has been stored in the jitter buffer 290 (see block 435). The put pointer 280 does not require updating, however, as the jitter buffer index of the fourth packet lies between the get and put pointers 270, 280.

Figure 7D:
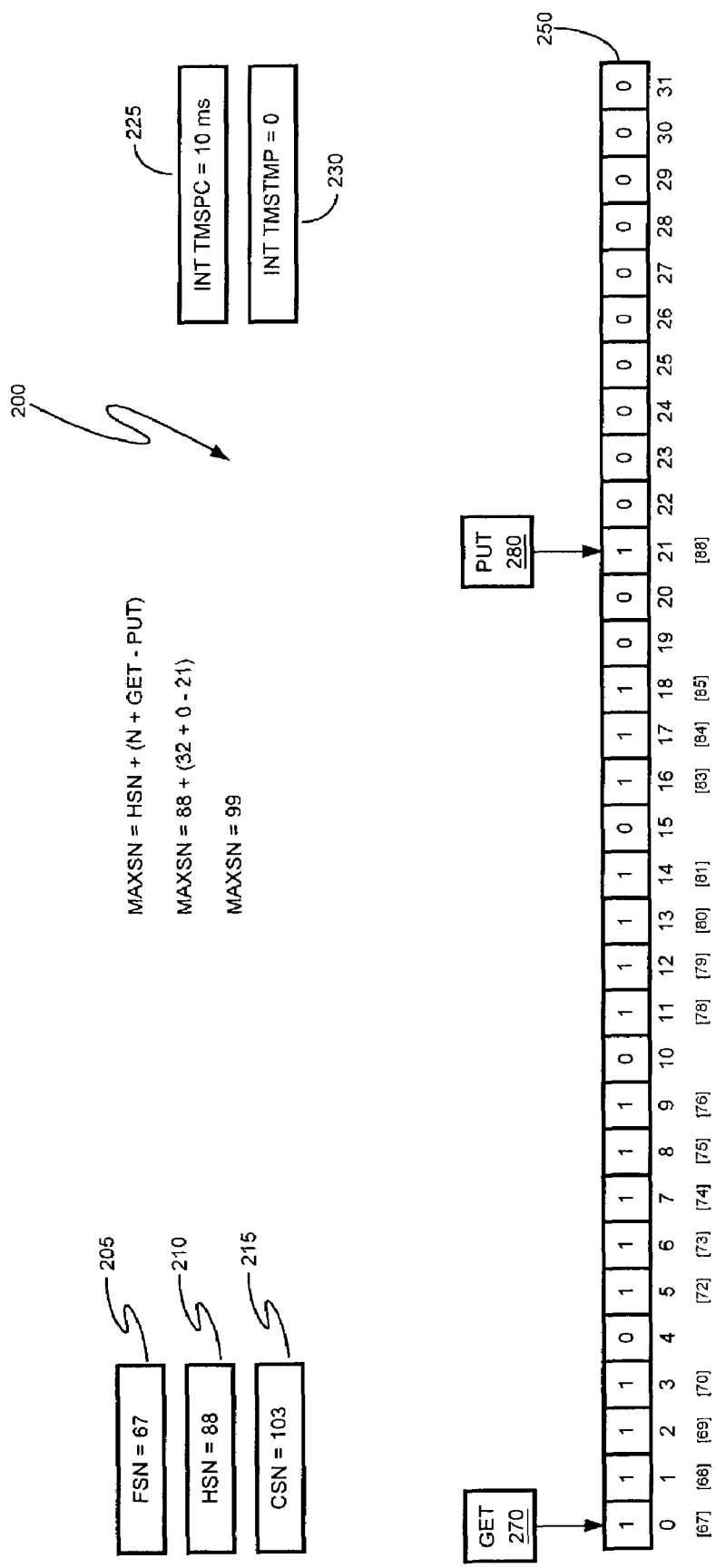

Turning to FIG. 7D, a number of additional packets have been received at receiving system 10 and stored in jitter buffer 290. Specifically, packets having sequence numbers of 68, 73, 74, 75, 76, 78, 79, 80, 81, 83, 84, 85, and 88—having jitter buffer indices of 1, 6, 7, 8, 9, 11, 12, 13, 14, 16, 17, 18, and 21, respectively—have been received and stored in jitter buffer 290. The status bit 262 in each entry 260 of bit array 250 corresponding to each of these packets (i.e., corresponding to the packet's jitter buffer index) has been set high to indicate that an associated packet is stored in memory. The put pointer 280 has also been updated to identify the entry 260 corresponding to the packet having the highest sequence number (HSN).

Still referring to FIG. 7D, another packet is received, this packet having a sequence number of 103 (i.e., the CSN equals 103). The CSN exceeds the HSN (i.e., 88) and, therefore, it needs to be determined if this packet is too early. With reference to FIG. 8, the get pointer 270 (i.e., 0) is less than the put pointer 280 (i.e., 21), and the MAXSN is determined as shown in block 815. The MAXSN equals 99 and, because the CSN (i.e., 103) exceeds the MAXSN (see block 825), the packet is too early and is discarded, as shown at block 830. In other words, there is insufficient memory space available in the jitter buffer 290 to receive this packet.

Figure 7E:
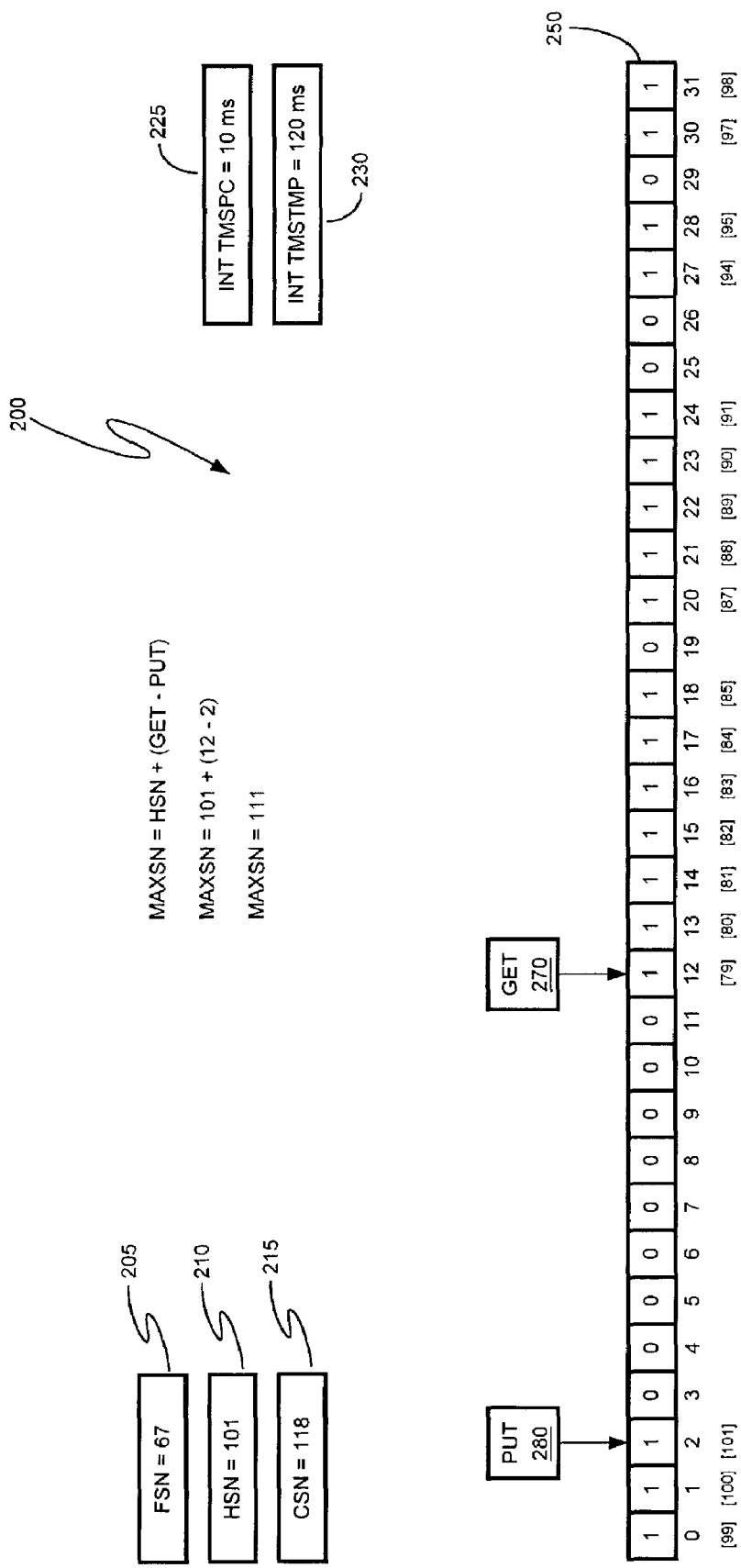

Referring now to FIG. 7E, a number of additional packets have been received and, further, the packet play-out process 600 has started. As set forth above for the example of FIGS. 7A-F, it was assumed that the receiving system 10 is no longer operating in the prefill mode, and packet play-out may have commenced in response to the prefill threshold having been reached. The number of status bits 262 in bit array 250 may be counted to determine whether the threshold number of packets has been received, such that there is a sufficient number of packets stored in the jitter buffer 290 to commence play-out.

In FIG. 7E, packets having sequence numbers of 67, 68, 69, 70, 72, 73, 74, 75, 76, and 78—jitter buffer indices of 0, 1, 2, 3, 5, 6, 7, 8, 9, and 11, respectively—have been played out according to play-out process 600 (with no marker bits). For example, to play out the first packet, the entry 260 in bit array 250 identified by the get pointer 270 (i.e., the entry numbered "0") was accessed (see block 620) to determine whether the status bit 262 was set high. This status bit was set high (see block 622) and the packet corresponding to this entry (i.e., the packet having a sequence number of 67 and a jitter buffer index of 0) was played out (see block 624). The INT TMSTMP 230 was incremented by the INT TMSPC 225 (see block 628), such that the INT TMSTMP 230 would equal 10 ms (i.e., the INT TMSTMP 230 was incremented from zero to 10 ms).

The get pointer was then updated (see block 630) to identify the next entry 260 of bit array 250, this entry corresponding to the next-in-line packet—i.e., the entry numbered "1" and referencing the packet having a jitter buffer index of 1 and a sequence number of 68—to be played out. The get pointer 270 does not correspond to the put pointer 280 (see block 642) and, assuming no END CNTRL PCKT has been received (see block 640), the play-out process continues. However, prior to accessing the next entry 260 of the bit array 250, the play-out process 600 waits for a period of time equal to the INT TMSPC 225 (see block 632).

Referring to FIG. 7E in conjunction with FIG. 7D, note that there were missing packets in the sequence of played-out packets. Specifically, packets having sequence numbers of 71 and 77 were missing (which would have corresponded to jitter buffer indices of 4 and 10, respectively). Thus, for example, when the entry 260 numbered "4" was accessed to read the status bit 262 (see block 622), the status bit was set low to indicate no corresponding packet was stored in the jitter buffer 290. Accordingly, a silence packet would have been played out (see block 626) to maintain synchronization in the packet flow. Each of the INT TMSTMP 230 and get pointer 270 were again incremented (see blocks 628, 630). At this point, the get pointer 270 would not have caught up to the put pointer 280 (see block 642) and, assuming again that no END CNTRL PCKT has been received (see block 640), the play-out process 600 waits for a period of time equal to the INT TMSPC 225 (see block 632) and then accesses the next entry 260 of the bit array 250 (see block 620). The entry 260 numbered "10" (corresponding to a missing packet of sequence number 77 and jitter buffer index 10) would be handled in a similar manner.

In FIG. 7E, a total of twelve (12) packets have been played out, wherein two of these packets were silence packets inserted due to missing packets. After play-out of each of these packets, the INT TMSTMP 230 was incremented by the INT TMSPC 225 (i.e., by 10 ms). The play-out process 600 also delayed a period of time equal to the INT TMSPC 225 after play-out of each packet and prior to play-out of the subsequent packet. As shown in FIG. 7E, the INT TMSTMP 230 is now equal to 120 ms. Thus, the next-in-line packet to be played out—i.e., the packet having sequence number 79 and jitter buffer index 12, this packet being referenced by the entry 260 numbered "12"13 will have an internal timestamp of 120 ms, which timestamp was inferred based, in part, upon this packet's relative position in the bit array 250.

Referring still to FIG. 7E, a number of new packets have been received, as noted above. Specifically, packets having sequence numbers of 82, 87, 89, 90, 91, 94, 95, 97, 98, 99, 100, and 101—and having jitter buffer indices of 15, 20, 22, 23, 24, 27, 28, 30, 31, 0, 1, and 2, respectively—have been received and stored in jitter buffer 290. Note that the put pointer 280 has wrapped around to the beginning of the bit array 250, moving toward the get pointer 270 as the get pointer traverses the bit array 250 during play-out.

As a further example of determining the jitter buffer index of a packet, the packet having sequence number 101 would have an initial NSN of 34 (see block 510 in FIG. 5), which exceeds N (see block 520). Therefore, a new NSN is calculated (see block 530) by subtracting N (i.e., 32) from the initial NSN (i.e., 34), the new NSN being equal to two (2). The newly calculated NSN is less than N, and the jitter buffer index would be equal to this new value of the NSN (see block 540). Thus, the jitter buffer index for the packet having sequence number 101 is two, and this packet is referenced by the entry 260 of bit array 250 that is numbered "2" (see FIG. 7E).

Still referring to FIG. 7E, another packet is received. This newly received packet has a sequence number of 118 (i.e., CSN equals 118). The CSN exceeds the HSN (i.e., 101) and, therefore, it is determined whether the packet is too early. However, the get pointer 270 exceeds the put pointer 280 in this instance, and the MAXSN is calculated according to block 820 in FIG. 8. The MAXSN equals 111, as shown in FIG. 7E. The CSN (i.e., 118) is greater than the MAXSN (i.e., 111) and, accordingly, the packet (having sequence number 118) is too early and is discarded (see block 830).

Figure 7F:
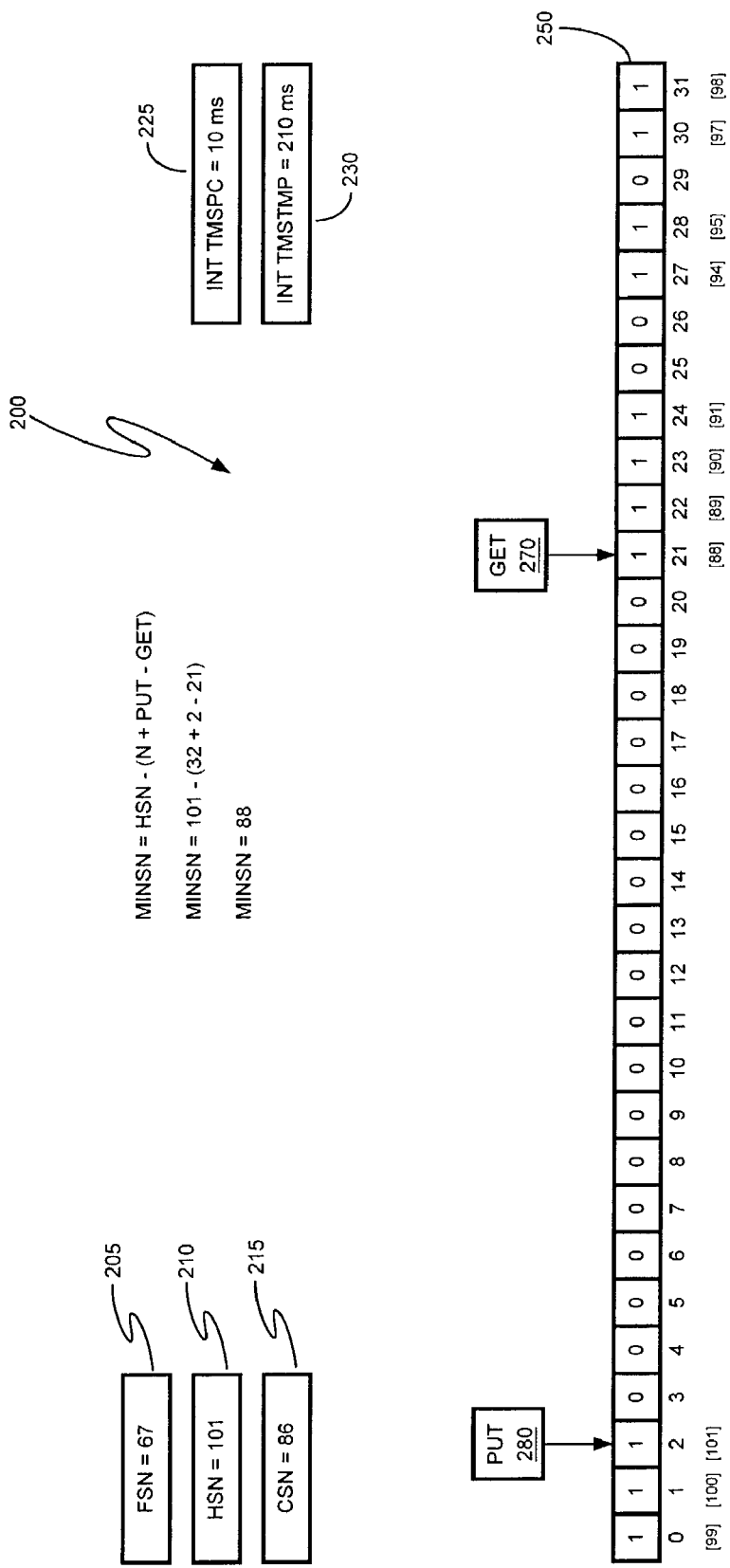

Referring now to FIG. 7F, additional packets have been played out from the jitter buffer 290. Specifically, packets having sequence numbers 79, 80, 81, 82, 83, 84, 85, and 87—and having jitter buffer indices of 12, 13, 14, 15, 16, 17, 18, and 20, respectively—have been played out, as described above (see blocks 620-632, 640, 642 in FIG. 6). Note that the entry 260 numbered "19" has a status bit 262 set to zero—thereby indicating that the corresponding packet (i.e., a packet having sequence number 86 and jitter buffer index 19) was missing—and a silence packet would have been played out in response to the low status bit (see blocks 622, 626 in FIG. 6), also as described above. Also, note that the INT TMSTMP 230 is now set to 210 ms, as twenty-one (21) packets (some of these being silence packets) have been played out.

The get pointer 270 now points to the entry 260 of bit array 250 numbered "21" (corresponding to packet of sequence number 88). The put pointer 280 remains at the entry 260 numbered "2", as no additional packets have been stored in the jitter buffer. However, a new packet having sequence number eighty-six (86) is received at the receiving system 10 (i.e., CSN equals 86). The CSN is less than the HSN (i.e., 101), and whether the newly received packet is too late needs to be determined. The get pointer 270 (i.e., 21) exceeds the put pointer 280 (i.e., 2), and the MINSN is calculated according to block 855. As shown in FIG. 7F, the MINSN is 88. Because the CSN (i.e., 86) is less than the MINSN (see block 865), the packet is too late—i.e., the play-out process has moved past this sequence number—and the packet is discarded (see block 870).

If marker bits had been used in the example of FIGS. 7A-F, the insertion and play-out processes 400, 600 would have proceeded in a similar fashion. However, the MRKR BIT 264 of each entry 260 would, if the status bit 262 of that entry 260 was set high, also have been read to determine whether the corresponding packet was the first packet following a period of silence (see blocks 654, 656). If the MRKR BIT 264 was not set to indicate the packet followed a period of silence, the packet would be handled as illustrated by blocks 658, 660, 662, and 664 in FIG. 6. However, if a packet was the first packet following a period of silence, the packet would be handled as shown at blocks 666, 668, 670, and 664 in FIG. 6. Specifically, the actual timestamp of the packet is read (see block 666) and a silence packet played out (see block 670) until the actual timestamp corresponds with the internal timestamp (see block 668), and the get pointer 270 is not incremented until the packet plays out. Also, for any missing packets (e.g., packets having sequence numbers of 71, 77, and 86, respectively), the absence of the packet corresponding to an accessed entry 260 of the bit array 250 is handled as shown at blocks 672, 674, 676, and 664 in FIG. 6. For each missing packet, the READ TMSTMP FLAG 220 is set to indicate the occurrence of the missing packet (see block 674), such that the actual timestamp of the next packet following the missing packet will be read (see blocks 656, 666 in FIG. 6).

It will be appreciated by those of ordinary skill in the art that the numbering scheme selected for the bit array 250 is arbitrary. Thus, it should be understood that an alternative numbering system (other than 0 to N−1) may be used and, further, that alternative algorithms—adapted to the alternative numbering system—may be used to calculate the jitter buffer index and to perform acceptance window determinations.

Embodiments of a jitter buffer 290 having an associated state array 200 including a bit array 250—as well as an embodiment of a packet insertion process 400 and an embodiment of a packet play-out process 600—having been herein described, those of ordinary skill in the art will appreciate the advantages thereof. Traversing a linked list of packets stored in a memory is not required. Rather, because the current state of a jitter buffer is maintained in an associated state array, the insertion process requires relatively simple, fixed latency calculations (e.g., jitter buffer index and acceptance window determinations), thereby minimizing latency and decreasing the overhead associated with packet processing. Further, by storing the current state of the jitter buffer in the state array, an internal time spacing may be inferred and applied to all packets in a flow of packets, and accesses to off-chip memory to read packet timestamps may be significantly reduced.

The foregoing detailed description and accompanying drawings are only illustrative and not restrictive. They have been provided primarily for a clear and comprehensive understanding of the disclosed embodiments and no unnecessary limitations are to be understood therefrom. Numerous additions, deletions, and modifications to the embodiments described herein, as well as alternative arrangements, may be devised by those skilled in the art without departing from the spirit of the disclosed embodiments and the scope of the appended claims.

What is claimed is:

1. A device comprising:
   a memory;
   a bit array stored in the memory, the bit array having a number of entries, each entry of the bit array including a status bit to indicate storage of a corresponding packet in a buffer;
   a first pointer stored in the memory, the first pointer to identify an entry of the bit array corresponding to a packet that is next-in-line for play-out; and
   a second pointer stored in the memory, the second pointer to identify an entry of the bit array corresponding to a packet having a highest sequence number,
   wherein a received packet is accepted or discarded based on a first comparison of whether the current sequence number of the received packet is greater than the highest sequence number and a second comparison of the current sequence number of the received packet with a threshold value, wherein the threshold value is determined based on whether the first pointer is greater than or less than the second pointer.

2. The device of claim 1, wherein each entry of the bit array further includes a marker bit to indicate whether a corresponding packet stored in the buffer is a packet of a sequence of packets to be played out that follows one or more missing packets from the sequence of packets to be played out.

3. The device of claim 1, wherein each entry of the bit array further includes a pointer to identify a memory location of the corresponding packet in the buffer.

4. The device of claim 1, wherein the number of entries of the bit array equals a maximum number of packets that can be stored in the buffer.

5. The device of claim 1, further comprising a flag stored in the memory, the flag to indicate that a timestamp is to be read from a packet.

6. A device comprising:
   a number of processing engines;
   a global memory coupled with each of the processing engines; and
   a number of state arrays stored in the global memory, each of the state arrays corresponding to a jitter buffer, each state array including:
   a bit array having a number of entries, each entry of the bit array including a status bit to indicate storage of a packet in the corresponding jitter buffer;
   a get pointer to identify an entry of the bit array corresponding to a packet that is next-in-line for play-out;
   a put pointer to identify an entry of the bit array corresponding to a packet having a highest sequence number,
   wherein a received packet is accepted or discarded based on a first comparison of whether the current sequence number of the received packet is greater than the highest sequence number and a second comparison of the current sequence number of the received packet with a threshold value, wherein the threshold value is determined based on whether the get pointer is greater than or less than the put pointer.

7. The device of claim 6, wherein each entry of the bit array further includes a marker bit to indicate whether a corresponding packet stored in the jitter buffer is a first packet following a period of silence.

8. The device of claim 6, wherein each entry of the bit array further includes a pointer to identify a memory location of the packet in the corresponding jitter buffer.

9. The device of claim 6, further comprising a network interface coupled with each of the processing engines and the global memory.

10. The device of claim 6, wherein each of the processing engines includes a local memory.

11. The device of claim 6, wherein the number of entries of the bit array equals a maximum number of packets that can be stored in the corresponding jitter buffer at any instant in time.

12. The device of claim 6, wherein each of the state arrays includes a read timestamp flag.

13. A system comprising:
   a memory, the memory having stored therein a number of jitter buffers; and
   a processing device coupled with the memory, the processing device including:
   a number of processing engines;
   a global memory coupled with each of the processing engines; and
   a number of state arrays stored in the global memory, each of the state arrays corresponding to one of the jitter buffers, each state array including:
   a bit array having a number of entries, each entry of the bit array including
   a status bit to indicate storage of a packet in the corresponding one jitter buffer;
   a get pointer to identify an entry of the bit array for a play-out process; and
   a put pointer to identify an entry of the bit array corresponding to a packet having a highest sequence number, wherein a received packet is accepted or discarded based on a first comparison of whether the current sequence number of the received packet is greater than the highest sequence number and a second comparison of the current sequence number of the received packet with a threshold value, wherein the threshold value is determined based on whether the get pointer is greater than or less than the put pointer.

14. The system of claim 13, wherein each entry of the bit array further includes a marker bit to indicate whether a corresponding packet stored in the jitter buffer is a first packet following a period of silence.

15. The system of claim 13, wherein each entry of the bit array further includes a pointer to identify a memory location of the packet in the corresponding one jitter buffer.

16. The system of claim 13, wherein the processing device further comprises a network interface coupled with each of the processing engines and the global memory.

17. The system of claim 13, wherein each of the processing engines of the processing device includes a local memory.

18. The system of claim 13, wherein the number of entries of the bit array equals a maximum number of packets that can be stored in the corresponding one jitter buffer at any instant in time.

19. The system of claim 13, wherein each of the state arrays includes a read timestamp flag.

20. A method comprising:
  storing a bit array in a memory, the bit array having a number of entries;
  storing a number of status bits in the memory, each of the status bits associated with one of the entries, each status bit to indicate storage in a buffer of a packet corresponding to the one entry;
  storing a first pointer in the memory, the first pointer to identify a first of the entries of the bit array, the first entry corresponding to a packet that is next-in-line to play out; and
  storing a second pointer in the memory, the second pointer to identify a second of the entries of the bit array, the second entry corresponding to a packet having a highest sequence number,
  wherein a received packet is accepted or discarded based on a first comparison of whether the current sequence number of the received packet is greater than the highest sequence number and a second comparison of the current sequence number of the received packet with a threshold value, wherein the threshold value is determined based on whether the first pointer is greater than or less than the second pointer.

21. The method of claim 20, further comprising storing a number of marker bits in the memory, each of the marker bits corresponding to one of the entries, each marker bit to indicate whether a packet corresponding to the one entry and stored in the buffer is a first packet of a sequence of packets to be played out that follows one or more missing packets from the sequence of packets to be played out.

22. The method of claim 20, further comprising storing a number of pointers in the memory, each of the pointers corresponding to one of the entries, each pointer to identify a memory location in the buffer of the packet corresponding to the one entry.

23. The method of claim 20, wherein the number of entries equals a maximum number of packets that can be stored in the buffer.

24. The method of claim 20, further comprising storing a flag in the memory, the flag to indicate that a timestamp is to be read from a packet.

25. An article of manufacture comprising:
  a medium having content that, when accessed by a device, causes the device to:
  store a bit array in a memory, the bit array having a number of entries;
  store a number of status bits in the memory, each of the status bits associated with one of the entries, each status bit to indicate storage in a buffer of a packet corresponding to the one entry;
  store a first pointer in the memory, the first pointer to identify a first of the entries of the bit array, the first entry corresponding to a packet that is next-in-line to play out; and
  store a second pointer in the memory, the second pointer to identify a second of the entries of the bit array, the second entry corresponding to a packet having a highest sequence number,
  wherein a received packet is accepted or discarded based on a first comparison of whether the current sequence number of the received packet is are greater than the highest sequence number and a second comparison of the current sequence number of the received packet with a threshold value wherein the threshold value is determined based on whether the first pointer is greater than or less than the second pointer.

26. The article of manufacture of claim 25, wherein the content, when accessed, further causes the device to store a number of marker bits in the memory, each of the marker bits corresponding to one of the entries, each of the marker bits to indicate whether a packet corresponding to one of the entry and stored in the buffer is a first packet of a sequence of packets to be played out that follows one or more missing packets from the sequence of packets to be played out.

27. The article of manufacture of claim 25, wherein the content, when accessed, further causes the device to store a number of pointers in the memory, each of the pointers corresponding to one of the entries, each pointer to identify a memory location in the buffer of the packet corresponding to the one entry.

28. The article of manufacture of claim 25, wherein the number of entries equals a maximum number of packets that can be stored in the buffer at any instant in time.

29. The article of manufacture of claim 25, wherein the content, when accessed, further causes the device to store a flag in the memory, the flag to indicate that a timestamp is to be read from a packet.

* * * * *

UNITED STATES PATENT AND TRADEMARK OFFICE
CERTIFICATE OF CORRECTION

| | | |
|---|---|---|
| PATENT NO. | : 7,336,678 B2 | Page 1 of 1 |
| APPLICATION NO. | : 10/210431 | |
| DATED | : February 26, 2008 | |
| INVENTOR(S) | : Vinnakota et al. | |

It is certified that error appears in the above-identified patent and that said Letters Patent is hereby corrected as shown below:

In column 22, line 30, in Claim 25, after "is" delete "are".

In column 22, line 33, in Claim 25, after "value" insert -- , --.

Signed and Sealed this

Twenty-fourth Day of June, 2008

JON W. DUDAS
*Director of the United States Patent and Trademark Office*